US010409466B2

(12) United States Patent
Thomas et al.

(10) Patent No.: US 10,409,466 B2
(45) Date of Patent: Sep. 10, 2019

(54) INTERACTIVE PRESENTATION SYSTEM

(71) Applicant: Thomas Creative Group Productions, LLC, Dallas, TX (US)

(72) Inventors: Callie Thomas, Dallas, TX (US); William Thomas, Dallas, TX (US)

(73) Assignee: Thomas Creative Group Productions, LLC, Dallas, TX (US)

( * ) Notice: Subject to any disclaimer, the term of this patent is extended or adjusted under 35 U.S.C. 154(b) by 60 days.

(21) Appl. No.: 15/799,104

(22) Filed: Oct. 31, 2017

(65) Prior Publication Data
US 2018/0052590 A1 Feb. 22, 2018

Related U.S. Application Data

(63) Continuation of application No. 15/069,892, filed on Mar. 14, 2016, now Pat. No. 9,830,059, which is a continuation of application No. 13/790,043, filed on Mar. 8, 2013, now Pat. No. 9,753,619.

(51) Int. Cl.
| | |
|---|---|
| *G06F 3/00* | (2006.01) |
| *G06F 3/0484* | (2013.01) |
| *G06F 16/438* | (2019.01) |
| *G06Q 10/10* | (2012.01) |
| *G06Q 30/02* | (2012.01) |

(Continued)

(52) U.S. Cl.
CPC ........ *G06F 3/04842* (2013.01); *G06F 3/0481* (2013.01); *G06F 16/4393* (2019.01);
(Continued)

(58) Field of Classification Search
CPC .............. G06F 3/04842; G06F 3/0481; G06F 16/4393; G06F 17/211; G06F 17/24; G06Q 10/10
See application file for complete search history.

(56) References Cited

U.S. PATENT DOCUMENTS

| | | | | |
|---|---|---|---|---|
| 5,852,435 A | * | 12/1998 | Vigneaux ............. | G11B 27/031 345/428 |
| 6,332,147 B1 | * | 12/2001 | Moran .................... | G06F 16/40 715/203 |

(Continued)

OTHER PUBLICATIONS

International Search Report and Written Opinion issued for PCT/US2014/015096, dated Jul. 8, 2014, 8 pages.

*Primary Examiner* — Nicholas Augustine
(74) *Attorney, Agent, or Firm* — Norton Rose Fulbright US LLP

(57) ABSTRACT

In some aspects, a method of authoring an interactive presentation includes defining a sequence of two or more primary content items within a presentation, and associating a link to additional content with a primary content item of the sequence in a non-transitory computer-readable medium. In additional aspects, a method of delivering an interactive presentation includes accessing the sequence of two or more primary content items, delivering the primary content items to a presentation device, and delivering, to applications operating on mobile devices of audience members, the primary content items with the additional content and/or one or more links thereto. In further aspects, a method of interacting with an interactive presentation includes receiving, by a mobile device of an audience member, a sequence of primary content items with additional content and/or one or more links thereto, and displaying the received primary content items and the additional content.

23 Claims, 31 Drawing Sheets

(51) Int. Cl.
*G06F 3/0481* (2013.01)
*G06F 17/21* (2006.01)
*G06F 17/24* (2006.01)
*G06F 3/01* (2006.01)

(52) U.S. Cl.
CPC ............ *G06F 17/211* (2013.01); *G06F 17/24* (2013.01); *G06Q 10/10* (2013.01); *G06Q 10/109* (2013.01); *G06Q 30/0241* (2013.01)

(56) References Cited

U.S. PATENT DOCUMENTS

| | | | | |
|---|---|---|---|---|
| RE38,401 E | * | 1/2004 | Goldberg | G06F 16/739 |
| | | | | 715/720 |
| RE38,609 E | * | 10/2004 | Chen | G06F 3/0483 |
| | | | | 715/720 |
| 6,807,361 B1 | * | 10/2004 | Girgensohn | G11B 27/034 |
| | | | | 386/227 |
| 7,149,974 B2 | * | 12/2006 | Girgensohn | G11B 27/034 |
| | | | | 715/723 |
| 7,213,051 B2 | * | 5/2007 | Zhu | H04L 12/1831 |
| | | | | 709/204 |
| 2005/0084232 A1 | * | 4/2005 | Herberger | G11B 27/031 |
| | | | | 386/282 |
| 2005/0154679 A1 | | 7/2005 | Bielak | |
| 2006/0093309 A1 | * | 5/2006 | Herberger | G11B 27/034 |
| | | | | 386/280 |
| 2012/0017141 A1 | | 1/2012 | Eelen et al. | |
| 2012/0023407 A1 | * | 1/2012 | Taylor | G06F 3/04842 |
| | | | | 715/731 |

\* cited by examiner

Listing Users

| Email | Name | Role | Account | Last Signed In | Actions | | |
|---|---|---|---|---|---|---|---|
| attendee4@techstore.com | Robot, Ima | Attendee —200 | Tech_Store_Corp | 2012-12-19 10:26:58 -0600 | Show | Edit | Del |
| clientuser1@techstore.com | White, Will | Client —202 | Tech_Store_Corp | 2012-10-18 12:45:33 -0500 | Show | Edit | Del |
| johnsmith@gmail.com | Smith, John | Presenter —204 | Tech_Store_Corp | | Show | Edit | Del |
| presenteruser2@tcg.com | Schmo, Joe | Attendee, —210 Presenter | TCGMeetingManagement | | Show | Edit | Del |
| admin@tcg.com | Brown, Mike | Admin —206 | TCGMeetingManagement | | Show | Edit | Del |
| superadmin@tcg.com | Green, Eddie | Superadmin —208 | TCGMeetingManagement | 2013-01-03 09:55:50 -0600 | Show | Edit | Del |
| attendee1@zorg.com | Black, Bob | Attendee | Zorg_Enterprises | | Show | Edit | Del |

Per Page: | 5 | 10 | 25 | 50 |

Add User —214

[ <<First ] [ <Prev ] [ 1 ] [ 2 ] —216

FIG. 2

Edit User

First name
[John] ← 300

Last name
[Smith]

Email
[JohnSmith@gmail.com] ← 302

Password
[ ]

Password confirmation
[ ] ← 304

Account
[Tech_Store_Corp 300 TechStore Circle ▽] ← 306

Roles
☐ Superadmin
☐ Admin
☐ Attendee ← 308
☑ Presenter
☐ Client

Event
┌─────────────────────────────┐
│ Tech_Store_Event_Nov_2012   │
├─────────────────────────────┤
│ Tech_Store_Event_Dec_2012   │
│                             │ ← 310
│                             │
└─────────────────────────────┘

[Save] ← 312
Show | Back

FIG. 3

Listing Presenter Bios

| User | Title | Content | Actions |
|---|---|---|---|
| John Smith | Senior Partner, LLC Industries | John has been involved in every aspect of his company... From cleaning bathrooms to darning socks, John has done it all. He brings such talent that it is totally awesome!@@ | Show Edit Destroy |

500 → 502 → 504 →  508 →

Per Page: |5|10|25|50|  ← 506

New Presenter Bio ← 600

Listing Venues

602 →  604 →  606 →

| Name | Description | Address | City | State | Zip | Phone | |
|---|---|---|---|---|---|---|---|
| 5 Star Hotel | Hotel | 123 Main St | Dallas | TX | 75202 | (214) 555-0000 | Show Edit Destroy |
| Golf Country Club | Country Club | 123 Mockingbird Lane | Dallas | TX | 75234 | (214) 555-0000 | Show Edit Destroy |
| Metropolitan Convention Center | The Convention Center | 123 North Street | Dallas | TX | 75202 | (214) 555-2700 | Show Edit Destroy |
| 3 Star Hotel | Dallas-Campbell Centre | 123 Central Road | Dallas | TX | 75206 | (214) 555-5500 | Show Edit Destroy |
| 4 Star Hotel Executive Conference Center | 3 miles from DFW Airport | 123 Highway East | Grapevine | TX | 76051 | (214) 555-5500 | Show Edit Destroy |
| Dallas Hotel | Large Hotel Conference Rooms | 555 South St | Dallas | TX | 75202 | (214) 666-6666 | Show Edit Destroy |

← 610

Per Page: |5|10|25|50|

New Venue ← 608

Editing Venue

Name
[5 Star Hotel] ← 700

Description
[Hotel] ← 702

Address
[123 Main St]

City
[Dallas]

State
[Texas ▽] ← 704

Zip
[75202]

Phone
[(214) 555-0000] ← 706

Latitude
[32.7799]

Longitude
[-96.7999] ← 708   710

Rooms:
Name: [200-A]   Descr: [meeting room]   Capacity: [250]
Remove

Name: [200-B]   Descr: [meeting room]   Capacity: [100]
Remove

Name: [200-C]   Descr: [meeting room]   Capacity: [300]
Remove

Add Room ← 712
[ Save ] ← 714

Show | Back

FIG. 7

Listing Events

| Name | Beg Date | | | | Actions | | | |
|---|---|---|---|---|---|---|---|---|
| | | 804 | 806 | 808 | 810 | 812 | 814 | 816 820 |
| Tech_Store_Event_Nov_2012 | 11/06/2012 - 08:30:00am | Sessions | Surveys | Videos | Home Ads | SSi1 Ads | SSi2 Ads | TL Show Edit Del |
| Petrol Company Annual Retreat | 11/05/2012 - 08:30:00am | Sessions | Surveys | Videos | Home Ads | SSi1 Ads | SSi2 Ads | TL Show Edit Del |
| Tech_Store_Event_Dec_2012 | 10/06/2012 - 10:00:00am | Sessions | Surveys | Videos | Home Ads | SSi1 Ads | SSi2 Ads | TL Show Edit Del |

Per Page: | 5 | 10 | 25 | 50 |

Add Event ◄──818

FIG. 8

Edit Event

{"event_id"=>"4", "from"=>"events_index", "num_per_page"=>"10", "action"=>"edit", "controller"=>"events", "id"=>"4"}

Account
TechStore_Corp ▽ ← 900
Name
Tech_Store_Event_Nov_2012 ← 902
Description
Sample Event for testing ← 904
Beg date
November ▽ 6 ▽ 2012 ▽ — 08 ▽ : 30 ▽ ← 906
End date
December ▽ 31 ▽ 2012 ▽ — 17 ▽ : 00 ▽
Venue
Dallas Hotel
Metropolitan Convention Center ← 908
5 Star Hotel
4 Star Hotel Executive Conference Center ☐ Finalize Event Schedule (NOTE: This will write out the Event Schedule and upload it to the CDN for retrieval by the users at the Event when they log in. Do this only when the Event Schedule is complete.) ← 910

☐ Finalize Presentation Manifests (NOTE: This will write out the Event Presentation Manifests for each Event Session and upload them to the CDN for retrieval by the users at the Event. Do this only when the Event Presentations are all uploaded and the Event Timeline is complete.) ← 912

Save ← 914

Show | Back

FIG. 9

{"from"=>"events_index", "num_per_page"=>"10", "action"=>"event_sessions_session_index", "controller"=>"event_sessions", "id"=>"4"}

Listing Event 'Tech_Store_Event_Nov_2012' Sessions

| | Name | Beg Date | Duration (hh:mm) | End Date | SeqNum | | Actions | | |
|---|---|---|---|---|---|---|---|---|---|
| ☐ | Morning Session | 11/15/2012 - 08:30AM | 03:30 | 11/15/2012 - 12:00PM | 5 | Presentations | Show | Edit | Destroy |
| ☐ | Afternoon Session | 11/15/2012 - 01:00PM | 04:00 | 11/15/2012 - 05:00PM | 10 | Presentations | Show | Edit | Destroy |

1000  1002  1004  1006  1008  1010  1014

1016

Edit Checked ← 1018

Back | New Event Session ← 1012

FIG. 10

{"event_id"=> "4", "from"=> events_index", "num_per_page"=>"10", "action"=>"event_sessions_presentation_index", "controller"=>"presentations", "id"=>"5"}

Listing Event 'Tech_Store_Event_Nov_2012' Session 'Morning Session' Presentations

| Name | Type | Beg Date | Duration (hh:mm) | End Date | | Actions | | |
|---|---|---|---|---|---|---|---|---|
| ☐ Default_Presentation | E | 11/15/2012 - 08:30AM | 00:15 | 11/15/2012 - 08:45AM | Show | Edit | Destroy | Pages | Slides |
| ☐ first_pres_mom | S | 11/15/2012 - 08:30AM | 00:30 | 11/15/2012 - 09:00AM | Show | Edit | Destroy | Pages | Slides |
| ☐ second_pres_mom | S | 11/15/2012 - 09:00AM | 01:00 | 11/15/2012 - 10:00AM | Show | Edit | Destroy | Pages | Slides |

[Edit Checked] ←1120

Back | New Presentation ←1114

FIG. 11

Presentation

{ "event_id"=>"4", "from"=>"events_index", "num_per_page"=>"10", "action"=>"show", "controller"=>"presentations", "id"=>"30"}

Event: Tech_Store_Event_Nov_2012

Account: Tech_Store_Corp
Presenter: Smith, John
Display Name: First Presentation of the morning ← 1200
System Name: first_pres_morn
Description: the first presentation of the morning session
Pres Beg Date: 11/15/2012 - 08:30AM
Pres End Date: 11/15/2012 - 09:00AM
Length (hh:mm): 00:30
Presentation File: morning_pres1_20.zip ← 1204

Venue:
Dallas Hotel
123 Main St
Dallas, TX
75202
Room: Venetian
Channel: /messages/5/30
Session Code:
Presentation Type: Session Presentation          1202
Screen Position: First Screen Pages:
01 http://1c032cb01ff0ec69ab3d-2580b94d971ac0f84feee88f1d073237.r67.cf1.rackcdn.com/TechStore Corp%2D30 first pres morn%2D002.png
02 http://1c032cb01ff0ec69ab3d-2580b94d971ac0f84feee88f1d073237.r67.cf1.rackcdn.com/TechStore Corp%2D30 first pres morn%2D003.png
03 http://1c032cb01ff0ec69ab3d-2580b94d971ac0f84feee88f1d073237.r67.cf1.rackcdn.com/TechStore Corp%2D30 first pres morn%2D004.png
04 http://1c032cb01ff0ec69ab3d-2580b94d971ac0f84feee88f1d073237.r67.cf1.rackcdn.com/TechStore Corp%2D30 first pres morn%2D005.png
05 http://1c032cb01ff0ec69ab3d-2580b94d971ac0f84feee88f1d073237.r67.cf1.rackcdn.com/TechStore Corp%2D30 first pres morn%2D006.png
06 http://1c032cb01ff0ec69ab3d-2580b94d971ac0f84feee88f1d073237.r67.cf1.rackcdn.com/TechStore Corp%2D30 first pres morn%2D007.png
07 http://1c032cb01ff0ec69ab3d-2580b94d971ac0f84feee88f1d073237.r67.cf1.rackcdn.com/TechStore Corp%2D30 first pres morn%2D008.png
08 http://1c032cb01ff0ec69ab3d-2580b94d971ac0f84feee88f1d073237.r67.cf1.rackcdn.com/TechStore Corp%2D30 first pres morn%2D009.png
09 http://1c032cb01ff0ec69ab3d-2580b94d971ac0f84feee88f1d073237.r67.cf1.rackcdn.com/TechStore Corp%2D30 first pres morn%2Dssi.2%20slides.010.png
10 http://1c032cb01ff0ec69ab3d-2580b94d971ac0f84feee88f1d073237.r67.cf1.rackcdn.com/TechStore Corp%2D30 first pres morn%2Dssi.2%20slides.011.png
11 http://1c032cb01ff0ec69ab3d-2580b94d971ac0f84feee88f1d073237.r67.cf1.rackcdn.com/TechStore Corp%2D30 first pres morn%2Dssi.2%20slides.012.png
12 http://1c032cb01ff0ec69ab3d-2580b94d971ac0f84feee88f1d073237.r67.cf1.rackcdn.com/TechStore Corp%2D30 first pres morn%2Dssi.2%20slides.014.png
13 http://1c032cb01ff0ec69ab3d-2580b94d971ac0f84feee88f1d073237.r67.cf1.rackcdn.com/TechStore Corp%2D30 first pres morn%2Dssi.2%20slides.015.png
14 http://1c032cb01ff0ec69ab3d-2580b94d971ac0f84feee88f1d073237.r67.cf1.rackcdn.com/TechStore Corp%2D30 first pres morn%2Dssi.2%20slides.016.png
15 http://1c032cb01ff0ec69ab3d-2580b94d971ac0f84feee88f1d073237.r67.cf1.rackcdn.com/TechStore Corp%2D30 first pres morn%2Dssi.2%20slides.017.png
16 http://1c032cb01ff0ec69ab3d-2580b94d971ac0f84feee88f1d073237.r67.cf1.rackcdn.com/TechStore Corp%2D30 first pres morn%2Dssi.2%20slides.018.png
17 http://1c032cb01ff0ec69ab3d-2580b94d971ac0f84feee88f1d073237.r67.cf1.rackcdn.com/TechStore Corp%2D30 first pres morn%2Dssi.2%20slides.019.png
18 http://1c032cb01ff0ec69ab3d-2580b94d971ac0f84feee88f1d073237.r67.cf1.rackcdn.com/TechStore Corp%2D30 first pres morn%2Dssi.2%20slides.020.png Back to Event Session Presentations

FIG. 12

Edit Presentation

{"event_id"=>"4", "func"=>"events_index", "num_per_page"=>"10", "action"=>"edit", "controller"=>"presentations", "id"=>"30"}

Event
Tech_Store_Event_Nov_2012 ▽ ←—1300
Venue
Dallas Hotel ▽ ←—1302
Room
Venetian ▽ ←—1304
Event session
Morning Session ▽ ←—1306
Presenter
TechStore_Corp - John Smith ▽ ←—1308
System name
first_pres_morn ←—1310
Display name
First Presentation of the morning ←—1312
Description
the first presentation of the morning session ←—1314
Beg date
November ▽ 15 ▽ 2012 ▽ — 08 ▽ : 30 ▽
Duration
0 hours:30 mins ▽ ←—1316
End date
November ▽ 15 ▽ 2012 ▽ — 09 ▽ : 00 ▽
Seq num
3 ▽ ←—1318
Presentation type
Session Presentation ▽ ←—1320
Screen position
First Screen ▽ ←—1322
Presentation
[ Browse... ] ←—1324
morning_pres1_20.zip
[ Save ] ←—1326

Show | Back to Session Presentations

FIG. 13

'Tech_Store_Event_Nov_2012' Event, 'first-pres-morn' slides

| "#" | Seq num | Slide | URL | Show | Edit | Destroy |
|---|---|---|---|---|---|---|
| 1 | 10 | | | Show | Edit | Destroy |
| 2 | 11 | | | Show | Edit | Destroy |
| 3 | 12 | | | Show | Edit | Destroy |
| 4 | 13 | | | Show | Edit | Destroy |
| 5 | 14 | | | Show | Edit | Destroy |
| 6 | 15 | | | Show | Edit | Destroy |
| 7 | 16 | | | Show | Edit | Destroy |
| 8 | 17 | | http://www.onlineencyclopedia.com | Show | Edit | Destroy |
| 9 | 18 | | | Show | Edit | Destroy |
| 10 | 19 | | | Show | Edit | Destroy |
| 11 | 20 | | http://www.visual.com | Show | Edit | Destroy |
| 12 | 21 | | http://www.digital.com | Show | Edit | Destroy |
| 13 | 22 | | http://techreports.org/Reports/2012/E-readers-and-tablets.aspx | Show | Edit | Destroy |
| 14 | 23 | | http://www.talk.tv/features.html | Show | Edit | Destroy |
| 15 | 24 | | http://smallbusinesstrends.com/2011/04/face-to-face-meetings.html | Show | Edit | Destroy |
| 16 | 25 | | | Show | Edit | Destroy |
| 17 | 26 | | | Show | Edit | Destroy |

FIG. 14

{"event_id"=>"4", "from"=>"events_index", "num_per_page"=>"10", "action"=>"edit", "controller"=>"presentation_pages", "id"=>"49"}

Updating Presentation Page

Account: TechStore_Corp
Presenter: Smith, John
Name: first_pres_morn ← 1500
Description: the first presentation of the morning session
Pres Beg Date: 11/15/2012 - 08:30AM
Pres End Date: 11/15/2012 - 09:00AM
Total Pages: 19

Venue:
Dallas Hotel
123 Main St
Dallas, TX
75202
Room: Venetian
Channel: /messages/5/30

Current Page: ← 1502
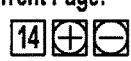

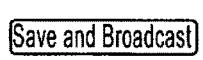 ← 1504

Back

FIG. 15

{"event_id"=>"4", "from"=>"events_index", "num_per_page"=>"10", "action"=>"index", "controller"=>"surveys"}

Listing Surveys for Event 'Tech_Store_Event_Nov_2012'

| Name | Event | Type | Created | Actions | | |
|---|---|---|---|---|---|---|
| Survey One | Tech_Store_Event_Nov_2012 | Survey | 11/07/2012 - 02:19PM | Take | Show | Edit Destroy |
| Survey Two | Tech_Store_Event_Nov_2012 | Survey | 11/08/2012 - 08:11AM | Take | Show | Edit Destroy |
| Poll One | Tech_Store_Event_Nov_2012 | Poll | 11/08/2012 - 08:55AM | Take | Show | Edit Destroy |
| Initial Survey | Tech_Store_Event_Nov_2012 | Initial | 11/30/2012 - 10:37AM | Take | Show | Edit Destroy |

New Survey | Back

Per Page: | 5 | 10 | 25 | 50 |

FIG. 18

Take the survey

1. What is "body temperature"?
 ○ A) 98.0
 ○ B) 99.5
 ○ C) 101.0
 ○ D) 98.6

2. What color is the sky?
 ○ A) Green
 ○ B) Blue
 ○ C) Yellow
 ○ D) None of the above

[ Save ]

FIG. 19

{"event_id"=>"4", "from"=>"events_index", "num_per_page"=>"10", "action"=>"edit", "controller"=>"surveys", "id"=>"1"}

Editing Survey for Event 'Tech_Store_Event_Nov_2012'

Name
[Survey One ▽] ← 2000
Survey type
[Survey ▽] ← 2002
Seq Num
[5 ▽] ← 2010
Question
[What is "body temperature"? △▽] ← 2016
Correct Answer
[D ▽] ← 2012
Remove Question
Answer Choice
[A ▽]
Answer Text
[98.0] Remove
Answer Choice
[B ▽] ← 2014
Answer Text
[99.5] Remove
Answer Choice
[C ▽]
Answer Text
[101.0] Remove ← 2018
Answer Choice
[D ▽]
Answer Text
[98.6] Remove
Add Answer ← 2008
Seq Num
[10 ▽]
Question
[What color is the sky? △▽]
Correct Answer
[B ▽]
Remove Question
Answer Choice
[A ▽]
Answer Text
[Green] Remove
Answer Choice
[B ▽]
Answer Text
[Blue] Remove
Answer Choice
[C ▽]
Answer Text
[Yellow] Remove
Answer Choice
[D ▽]
Answer Text
[None of the above] Remove
Add Answer ← 2006
Add Question ← 2004
[Save]
Show | Back ← 2020

FIG. 20

Videos for Event 'Tech_Store_Event_Nov_2012'

{"even_id"=>"4", "from"=>"events_index", "num_per_page"=>"10", "action"=>"index", "controller"=>"videos"}

| TL Presentation | Name | Cdn url | Cdn uploaded date | | | |
|---|---|---|---|---|---|---|
| first_pres_afternoon | AmbitDemo | http://1cd32cb01ff0ec69ab3d-2580b94d971ac0f84feee88f1d073237.r67.cf1.rackcdn.com/video_3_AmbitDemo_20121213032132299 | 2012-12-13 09:21:51-0600 | Show | Edit | Destroy |
| first_pres_afternoon | PPAla | http://1cd32cb01ff0ec69ab3d-2580b94d971ac0f84feee88f1d073237.r67.cf1.rackcdn.com/video_2_PPAla_20121213032048594 | 2012-12-13 09:20:53-0600 | Show | Edit | Destroy |
| first_pres_morn | tcgdemo_560x316 | http://1cd32cb01ff0ec69ab3d-2580b94d971ac0f84feee88f1d073237.r67.cf1.rackcdn.com/video_1_tcgdemo_560x316_20121212044255708 | 2012-12-12 10:42:49-0600 | Show | Edit | Destroy |

2100 → first column header area; 2102 → tcgdemo row; 2104 → Cdn url; 2106 → date; 2108 → New Video; 2110 → Show Edit Destroy New Video

FIG. 21

Editing video

{"event_id"=>"4", "from"=>"events_index", "num_per_page"=>"10", "action"=>"edit", "controller"=>"videos", "id"=>"3"}

Event
[Tech_Store_Event_Nov_2012 ▽] ← 2200

Name
[AmbitDemo] ← 2202

Video File: [Browse] AmbitDemo_560x316.mp4 ← 2204

[Save] ← 2206

Show | Back

FIG. 22

Home Screen Advertisements

{"advertisement_type"=>"home", "event_id"=>"4", "from"=>"events_index", "num_per_page"=>"10", "action"=>"index", "controller"=>"advertisements"}

| Event | Name | Home Seq# | Home Ad Image | Actions | |
|---|---|---|---|---|---|
| Tech_Store_Event_Nov_2012 | SSI2 Ad V4 | 8 | [img] | Show | Edit Destroy |
| Tech_Store_Event_Nov_2012 | SSI2 Ad V3 | 6 | [img] | Show | Edit Destroy |
| Tech_Store_Event_Nov_2012 | SSI2 Ad V5 | 10 | [img] | Show | Edit Destroy |
| Tech_Store_Event_Nov_2012 | SSI2 Ad V2 | 4 | | Show | Edit Destroy |

Per Page: |5| 10 |25| 50|

New Home Screen Advertisement

FIG. 23

Editing Home Advertisement

Event: Tech_Store_Event_Nov_2012 ← 2400
Name: SSI2 Ad V4 ← 2406
Title: 1:00 min ← 2402
Url: http://www.visual.com ← 2408
Home Ad Image: [Browse...] ssi2_adV4_2x.png ← 2410
SS1 Seq Num: 8 ← 2404
[Save] ← 2412

Show | Back

FIG. 24

Home Screen Advertisement

{"advertisement_type"=>"home", "event_id"=> "4" "from"=>"events_index", "num_per_page"=>"10", "action"=>"show", "controller"=>"advertisements", "id"=>"14"}

Type: home
Event: Tech_Store_Event_Nov_2012
Name: SSI2 Ad V4 ← 2500
Duration: 01:00 mins
Home Ad Image:

← 2504

Home Ad CDN uploaded date: 12/07/2012 - 02:52PM
Home Seq num: 8 ← 2502
Edit | Back

SSi1 Advertisements

{"advertisement_type"=>"ssi1", "event_id"=>"4", "from"=>"events_index", "num_per_page"=>"10", "action"=>"index", "controller"=>"advertisements"}

| Event | Name | SS1 Seq# | SS1 Ad Image | Actions | | |
|---|---|---|---|---|---|---|
| Tech_Store_Event_Nov_2012 | Test SS1 Ad #1 | 1 | {~~~} | Show | Edit | Destroy |
| Tech_Store_Event_Nov_2012 | Test SS1 Ad #2 | 2 | {~~~} | Show | Edit | Destroy |
| Tech_Store_Event_Nov_2012 | Test SS1 Ad #3 | 3 | {~~~} | Show | Edit | Destroy |
| Tech_Store_Event_Nov_2012 | Test SS1 Ad #4 | 4 | {~~~} | Show | Edit | Destroy |
| Tech_Store_Event_Nov_2012 | Test SS1 Ad #5 | 5 | {~~~} | Show | Edit | Destroy |
| Tech_Store_Event_Nov_2012 | Test SS1, Type 2 Ad #1 | 6 | [img] | Show | Edit | Destroy |
| Tech_Store_Event_Nov_2012 | Test SS1, Type 2 Ad #2 | 7 | [img] | Show | Edit | Destroy |
| Tech_Store_Event_Nov_2012 | Test SS1, Type 2 Ad #3 | 8 | [img] | Show | Edit | Destroy |
| Tech_Store_Event_Nov_2012 | Test SS1, Type 2 Ad #4 | 9 | [img] | Show | Edit | Destroy |
| Tech_Store_Event_Nov_2012 | Test SS1, Type 2 Ad #5 | 10 | [img] | Show | Edit | Destroy |

Per Page: |5|10|25|50|

New SSi1 Advertisement

FIG. 26

Editing SSi1 Advertisement

Event: Tech_Store_Event_Nov_2012 ▽ ←—2400
Name: Test SS1 Ad #1 ←—2408
Duration: 1:00 min ▽ ←—2402
Url: http://www.visual.com ←—2410
SS1 Ad Image: [    ] [Browse...] ad1_v1_2x.png ←—2412
SS1 Seq Num: 1 ▽ ←—2404
SS1 Subtype: Type 1: displays on top ▽ ←—2406
[Save] ←—2414

Show | Back

FIG. 27

SSi1 Advertisement

{"advertisement_type"=>"ssi1", "event_id"=> "4" "from"=>"events_index", "num_per_page"=>"10", "action"=>"show", "controller"=>"advertisements", "id"=>"1"}

Type: ssi1
Event: Tech_Store_Event_Nov_2012
Name: Test SS1 Ad #1  ←—2800
Duration: 01:00 mins

SS1 Ad Image:

←—2804

SS1 Ad CDN uploaded date: 12/07/2012 - 02:00PM
SS1 Seq num: 1
SS1 Sub Type: 1  ←—2802
Edit | Back

SSi2 Advertisements

{"advertisement_type"=>"ssi2", "event_id"=>"4", "from"=>"events_index", "num_per_page"=>"10", "action"=>"index", "controller"=>"advertisements"}

| Event | Name | SS2 Seq# | SS2 Ad Image | Actions |
|---|---|---|---|---|
| Tech_Store_Event_Nov_2012 ← 2900 | SSi2 Ad V1 ← 2902 | 1 ← 2904 | ▭ ← 2906 | Show Edit Destroy ← 2910 |

Per Page: | 5 | 10 | 25 | 50 |
New SSi2 Advertisement ← 2908

FIG. 29

Editing SSi2 Advertisement

Event
[Tech_Store_Event_Nov_2012 ▽] ← 3000
Name
[SSi2 Ad V1] ← 3006
Duration
[1:00 min ▽] ← 3002
Url
[http://www.visual.com] ← 3008
SS2 Ad Image: [Browse...] ssi2_adV1_2x.png ← 3010
SS2 Seq Num: [1 ▽] ← 3004
[Save] ← 3012

Show | Back

FIG. 30

SSi2 Advertisement

{"advertisement_type"=>"ssi2", "event_id"=> "4", "from"=>"events_index", "num_per_page"=>"10", "action"=>"show", "controller"=>"advertisements", "id"=>"3"}

Type: ssi2
Event: Tech_Store_Event_Nov_2012
Name: SSi2 Ad V1        ← 3100
Duration: 01:00 mins
SS2 Ad Image:

← 3104

SS2 Ad CDN uploaded date: 12/07/2012 - 02:25PM
SS2 Seq num: 1    ← 3102
Edit | Back

Event Timeline for Event 'Tech_Store_Event_Nov_2012' 3200

| Session | Presentation | Slide # | Image | Insert Survey/Poll or Video After Slide | |
|---|---|---|---|---|---|
| Morning Session | Default_Presentation | 1 | | | |
| | first_pres_morn | 1 | | | |
| | | 2 | | Survey One | |
| | | 3 | | Survey One / Survey Two / Poll One / Initial Survey | |
| | | 4 | | | |
| | | 5 | | Survey Two | |
| | | 6 | | | |
| | | 7 | | | |
| | | 8 | | Poll One | |
| | | 9 | | | |
| | | 10 | | | |
| | | 11 | | | |
| | | 12 | | | tcgdemo_560x310 |
| | | 13 | | | tcgdemo_560x310 / PPsta |
| | | 14 | | | |
| | | 15 | | | |
| | | 16 | | | |
| | | 17 | | | |
| | | 18 | | | |
| | second_pres_morn | 1 | | | |
| | | 2 | | Survey Two | |
| | | 3 | | | |
| | | 4 | | | |
| | | 5 | | | |
| | | 6 | | | |
| Afternoon Session | first_pres_afternoon | 1 | | | |
| | | 2 | | | |
| | | 3 | | | PPsta |
| | | 4 | | | |
| | | 5 | | | AmbiDemo |
| | | 6 | | | |

[Save Timeline] (! ! !) indicates that slides are out of sync with the Event Timeline; re-save the Event Timeline.

FIG. 32

INTERACTIVE PRESENTATION SYSTEM

CROSS-REFERENCE TO RELATED APPLICATIONS

The present application is a continuation of U.S. patent application Ser. No. 15/069,892 filed Mar. 14, 2016, entitled "INTERACTIVE PRESENTATION SYSTEM," which is a continuation of U.S. patent application Ser. No. 13/790,043, filed Mar. 8, 2013, and issued Sep. 5, 2017, as U.S. Pat. No. 9,753,619, entitled "INTERACTIVE PRESENTATION SYSTEM," the disclosures of which are incorporated herein by reference in their entirety.

TECHNICAL FIELD

This disclosure is generally directed to presentation systems. This disclosure is specifically directed to an interactive presentation system.

BACKGROUND

Studies show that visual elements are a useful component of professional presentations. For example, it has been demonstrated that use of visual elements reduces meeting times, and that that audiences view presenters who use visual elements as more professional and credible than presenters who merely speak. It has also been demonstrated that meetings and presentations reinforced with visual elements help participants reach decisions and consensus in less time.

A typical visual element of a presentation is a presentation slide. A slide is a single page of a presentation. Collectively, a group of slides may be known as a slide deck or slide show. Historically, a slide was created on a transparency and viewed with an overhead projector. In today's digital age, a slide most commonly refers to a single page developed using a presentation program. It is also possible to create slides with a document markup language. Modern internet-based presentation software also allows presentations to be developed collaboratively by geographically disparate collaborators.

More recently, presentations are often held at venues having video screens, such as movie theaters. These types of venues lend themselves to incorporating other types of visual elements, such as videos. Multiple screens may be used to simultaneously provide different types visual elements and/or multiple visual elements of the same types.

The recent proliferation of mobile devices, such as smart phones and tablets, has led to an explosion of social media and mobile applications that facilitate user access to information, and also facilitate user interactions with information and with one another. Presently, these mobile devices may compete for the attention of presentation audience members attempting to multitask by dividing their attention between their mobile devices and the visual elements of a presentation. The present disclosure addresses the needs of today's presenters and audiences.

BRIEF SUMMARY

In some aspects, a method of authoring an interactive presentation includes receiving, by a computer processor, user selections to define a sequence of two or more primary content items within a presentation. The method also includes, responsive to the user selections, recording, by the computer processor, the sequence of two or more primary content items in a non-transitory computer-readable medium. The method additionally includes receiving, by the computer processor, a user selection to associate a link to additional content with a primary content item of the sequence of two or more primary content items. The method further includes, responsive to the user selection, recording the link to the additional content in the non-transitory computer-readable medium. The link to the additional content is recorded in association with the primary content item.

In other aspects, an apparatus for authoring an interactive presentation includes means for receiving user selections to define a sequence of two or more primary content items within a presentation. The apparatus additionally includes means for responding to the user selections by recording the sequence of two or more primary content items in a non-transitory computer-readable medium. The apparatus also includes means for receiving a user selection to associate a link to additional content with a primary content item of the sequence of two or more primary content items. The apparatus further includes means for responding to the user selection by recording the link to the additional content in the non-transitory computer-readable medium. The link to the additional content is recorded in association with the primary content item.

In additional aspects, a method of delivering an interactive presentation includes accessing, by a computer processor, a non-transitory computer-readable medium having recorded therein a sequence of two or more primary content items. The non-transitory computer-readable medium has recorded therein a link to additional content that is recorded in association with a primary content item of the sequence of two or more primary content items. The method additionally includes delivering, by the computer processor, the primary content items to a presentation device operatively connected to present the primary content items to an audience. The method also includes delivering, by the computer processor, the primary content items to one or more applications operating on mobile devices of audience members. The primary content items are delivered in an order according to the sequence of the two or more content items. The method further includes performing, over a computer network to the one or more applications, delivery of the additional content and/or the link to the additional content. The delivery of the additional content and/or the link occurs substantially simultaneously with the delivery of the primary content item with which the link to the additional content is recorded in association in the non-transitory computer-readable medium.

In further aspects, an apparatus for delivering an interactive presentation includes means for accessing a non-transitory computer-readable medium having recorded therein a sequence of two or more primary content items. The non-transitory computer-readable medium has recorded therein a link to additional content that is recorded in association with a primary content item of the sequence of two or more primary content items. The apparatus additionally includes means for delivering, by the computer processor, the primary content items to a presentation device operatively connected to present the primary content items to an audience. The apparatus further includes means for delivering, by the computer processor, the primary content items to one or more applications operating on mobile devices of audience members. The primary content items are delivered in an order according to the sequence of the two or more content items. The apparatus further includes means for performing, over a computer network to the one or more applications, delivery of the additional content and/or the link to the additional content. The delivery of the additional content and/or the link occurs substantially simultaneously with the delivery of the primary content item with which the link to the additional content is recorded in association in the non-transitory computer-readable medium.

In other aspects, a method of interacting with an interactive presentation includes receiving, by a computer processor of a mobile device, a user selection to interact with an interactive presentation. The method additionally includes, responsive the user selection, receiving, by the computer processor, a sequence of primary content items and additional content and/or a link to additional content. The additional content and/or the link to the additional content is received substantially simultaneously with a primary content item of the sequence of content items, and/or instead of a primary content item of the sequence of content items. The method also includes displaying received primary content items and the additional content via a display of the mobile device.

In still further aspects, an apparatus for interacting with an interactive presentation includes means for receiving a user selection to interact with an interactive presentation. The apparatus additionally includes means for responding to the user selection by receiving a sequence of primary content items and additional content and/or a link to additional content. The additional content and/or the link to the additional content is received substantially simultaneously with a primary content item of the sequence of content items, and/or instead of a primary content item of the sequence of content items. The apparatus also includes means for displaying received primary content items and the additional content.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying FIGURES, in which:

FIG. 2 is a graphical representation of a graphical user interface in a user account list display mode of operation in accordance with one aspect of the present disclosure;

FIG. 3 is a graphical representation of a graphical user interface in a user account editing mode of operation in accordance with one aspect of the present disclosure;

FIG. 5 is a graphical representation of a graphical user interface in a presenter bio list display mode of operation in accordance with one aspect of the present disclosure;

FIG. 6 is a graphical representation of a graphical user interface in a venue list display mode of operation in accordance with one aspect of the present disclosure;

FIG. 7 is a graphical representation of a graphical user interface in a venue editing mode of operation in accordance with one aspect of the present disclosure;

FIG. 8 is a graphical representation of a graphical user interface in an event list display mode of operation in accordance with one aspect of the present disclosure;

FIG. 9 is a graphical representation of a graphical user interface in an event editing mode of operation in accordance with one aspect of the present disclosure;

FIG. 10 is a graphical representation of a graphical user interface in a session list display mode of operation in accordance with one aspect of the present disclosure;

FIG. 11 is a graphical representation of a graphical user interface in a presentation list display mode of operation in accordance with one aspect of the present disclosure;

FIG. 12 is a graphical representation of a graphical user interface in a presentation information display mode of operation in accordance with one aspect of the present disclosure;

FIG. 13 is a graphical representation of a graphical user interface in a presentation editing mode of operation in accordance with one aspect of the present disclosure;

FIG. 14 is a graphical representation of a graphical user interface in a presentation slide sequence display mode of operation in accordance with one aspect of the present disclosure;

FIG. 15 is a graphical representation of a graphical user interface in a presentation page updating mode of operation in accordance with one aspect of the present disclosure;

FIG. 18 is a graphical representation of a graphical user interface in an event survey list display mode of operation in accordance with one aspect of the present disclosure;

FIG. 19 is a graphical representation of a graphical user interface in a survey taking mode of operation in accordance with one aspect of the present disclosure;

FIG. 20 is a graphical representation of a graphical user interface in an event survey editing mode of operation in accordance with one aspect of the present disclosure;

FIG. 21 is a graphical representation of a graphical user interface in an event video list display mode of operation in accordance with one aspect of the present disclosure;

FIG. 22 is a graphical representation of a graphical user interface in an event video editing mode of operation in accordance with one aspect of the present disclosure;

FIG. 23 is a graphical representation of a graphical user interface in a home screen advertisement list display mode of operation in accordance with one aspect of the present disclosure;

FIG. 24 is a graphical representation of a graphical user interface in a home screen advertisement editing mode of operation in accordance with one aspect of the present disclosure;

FIG. 26 is a graphical representation of a graphical user interface in a first secondary screen advertisement list display mode of operation in accordance with one aspect of the present disclosure;

FIG. 27 is a graphical representation of a graphical user interface in a first secondary screen advertisement editing mode of operation in accordance with one aspect of the present disclosure;

FIG. 29 is a graphical representation of a graphical user interface in a second secondary screen advertisement list display mode of operation in accordance with one aspect of the present disclosure;

FIG. 30 is a graphical representation of a graphical user interface in a second secondary screen advertisement editing mode of operation in accordance with one aspect of the present disclosure;

FIG. 32 is a graphical representation of a graphical user interface in an event timeline display and editing mode of operation in accordance with one aspect of the present disclosure;

DETAILED DESCRIPTION

The inventive concept of the present disclosure utilizes an interactive presentation engine and mobile device application to leverage mobile devices of audience members as platforms for providing visual elements of a presentation to audience members in concert with other tools, such as social media tools. Advantageously, the interactive presentation engine and mobile device application enable additional information associated with a sequenced visual element of a presentation to be sent to the mobile devices of audience members as the visual element is presented to the audience by a display at the presentation venue. Some types of additional information may include additional visual elements, such as supplemental slides or advertisements. Other types of additional information may include interactive elements, such as polls or questionnaires. Accordingly, audience members may attend to their mobile devices without dividing their attention between the mobile devices and displays of the presentation venue, and may also be further engaged by supplemental visual elements and or interactive elements. In some implementations, interactions of audience members with the elements sent to their mobile devices may be compiled and provided to presenters and/or the audience members, either after the presentation or in real time. For example, in a real time implementation, compiled answers to polls or other interactive elements may be displayed by primary displays of the presentation venue and/or via the mobile devices before the end of the presentation, and chat features of the mobile devices may be leveraged for use in a question and answer session of the presentation.

Figure 1:
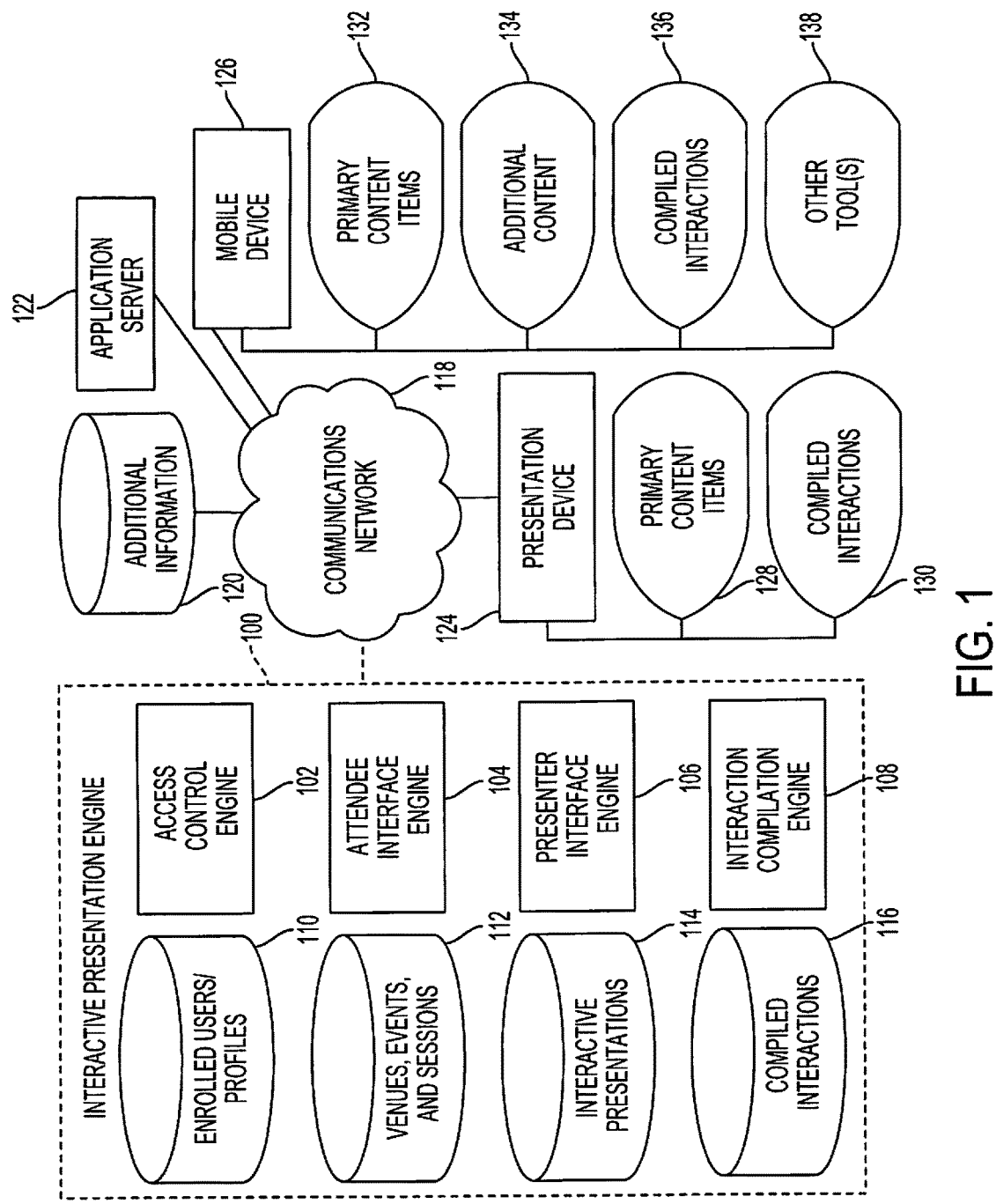
FIG. 1 is a block diagram illustrating an interactive presentation system in accordance with one aspect of the present disclosure.

Turning to FIG. 1, an interactive presentation engine 100 may be configured as a content management system interfaced with a content delivery network. The interactive presentation engine may have various software driven engines, such as an access control engine 102, an attendee interface engine 104, a presenter interface engine 106, and/or an interaction compilation engine 108. The interactive presentation engine may additionally have one or more databases including various datastores, such as enrolled users/profiles datastore 110, venues, events, and sessions datastore 112, interactive presentations datastore 114, and compiled interactions datastore 116. The interactive presentation engine 100 may be comprised of one or more computer processors and non-transitory computer-readable media, and may be connected to a communications network 118, such as the Internet and/or cellular network. Another datastore 120 containing additional information may be collocated with interactive presentation engine 118 and/or interfaced therewith over communications network 118. An application server 122, such as an "app store," may also be collocated with the interactive presentation system 100, and/or interfaced therewith over communications network 118. It is envisioned that a presentation device 124 and at least one mobile device 126 may be remotely located from interactive presentation engine 100 at a presentation venue, and interfaced with interactive presentation engine 100 via communications network 118. As further explained below, these engines 102-108, datastores 110-116 and 120, and devices 124 and 126 may interact to facilitate authoring of interactive presentations, delivery of interactive presentations, and/or interaction with an interactive presentation.

Access control engine 102 may permit users, such as administrators, clients, presenters, and attendees, to create accounts and define profiles in enrolled users/profiles datastore 110. For example, users may have privileges for interacting with engines 104 and 106, and datastores 110-116 and 120 based on type of user account and associations of the user account with accounts of other types. It is envisioned that users may interact with access control engine via presentation device 124, mobile device 126 or any other processor, whether local to or interfaced with interactive presentation engine 100 via communications network 100. Access control engine may further allow administrators and/or clients to define venues, events, and sessions in venues, events, and sessions datastore 112.

Presenter interface engine 106 may operate under control of access control engine 102 to permit a user having a presenter type of account, and associated with a particular client account, event, and/or session, to access venues, events, and sessions datastore 112 and interactive presentations datastore 114. For example, presenter interface engine 106 may permit the presenter to author an interactive presentation of datastore 114 associated with the particular client, event, venue, and session. Additionally, the presenter interface may permit the presenter to access additional information datastore 120 to create or select additional information for the interactive presentation. Other types of users, such as administrators and/or clients, may also be able to employ the presenter interface engine in the same or similar fashion. The presenter interface engine may further configure the presenter's computer processor to operate as presentation device, and may send primary content items of the interactive presentation in datastore 114 and compiled audience member interactions of datastore 116 to the presentation device 124 for display at 128 and 130. Further capabilities of presenter interface engine 106 will be explained in greater detail below.

Attendee interface engine 104 may operate under control of access control engine 102 to permit an attendee to request to interact with an interactive presentation of datastore 114. It is envisioned that the attendee user may already have a mobile device 126 configured with an application obtained from application server 122, and thereby operable to interact with attendee interface engine 114. It is also envisioned that an attendee may employ a browser of the mobile device 126 to interact with the attendee interface engine 104 and/or access control engine 102 to request to interact with the presentation of datastore 114. In this implementation, interactive presentation engine may instruct the user to acquire the application from application server 122, and this application may be specific to a particular client with which the presentation is associated. The application may then configure the mobile device 126 of the user to interface with attendee interface engine 104 and thereby interact with the interactive presentation of datastore 114. Accordingly, the mobile device 126 may be configured to receive primary content items of the interactive presentation in datastore 114, and additional content of datastore 120, and to display these elements at 132 and 134, together with other tools at 138, such as social media tools or additional tools as further described herein. The mobile device 126 may also be configured to permit the user to interact with the primary content items and the additional content, and to send data representing the user interactions to interaction compilation engine 108. Interaction compilation engine 108 may then compile the interactions of multiple audience members, and store data representing the compiled interactions in datastore 116. In some implementations, attendee interface engine 104 may further send the compiled interactions, filtered for the presentation, back to the mobile device 126. The mobile device may be configured by the application to display the compiled interactions at 136. Further capabilities of attendee interface engine 104 and the configured mobile device 126 will be explained in greater detail below.

In some implementations, the engines 102-108 and datastores 110-116 and 120 may be provided as a combination of a graphical user interface, development databases, and a content delivery network. The graphical user interface may permit the users to create and edit data objects, such as accounts, users, venues, events, sessions, and interactive presentations, and upload event schedules and presentation manifests to the content delivery network upon completion. Devices 124 and 126 may then receive content from the content delivery network.

As shown in FIG. 2, a graphical user interface of the interactive presentation engine may permit definition of different types of user accounts. For example, an attendee account 200, client account 202, presenter account 204, admin account 206, and/or superadmin account 208 may be created. Additionally, a user account may be created that has more than one type, and therefore more than one set of permissions, such as an attendee/presenter account 210. These user accounts may further each be associated with a particular client account at 212. New accounts may be added by text button control 214, and existing accounts may be edited by controls 216.

As shown in FIG. 3, during creation or editing of a user account, the graphical user interface may allow specification of user credentials in various text boxes, such as name 300, email 302, and password 304 may be defined. Additionally, a client account may be selected in drop down menu 306, and a user account type may be specified by selection of one or more check boxes 308. Also, one or more events may be specified in menu 310. These selections may be saved by text button control 312.

Figure 4:
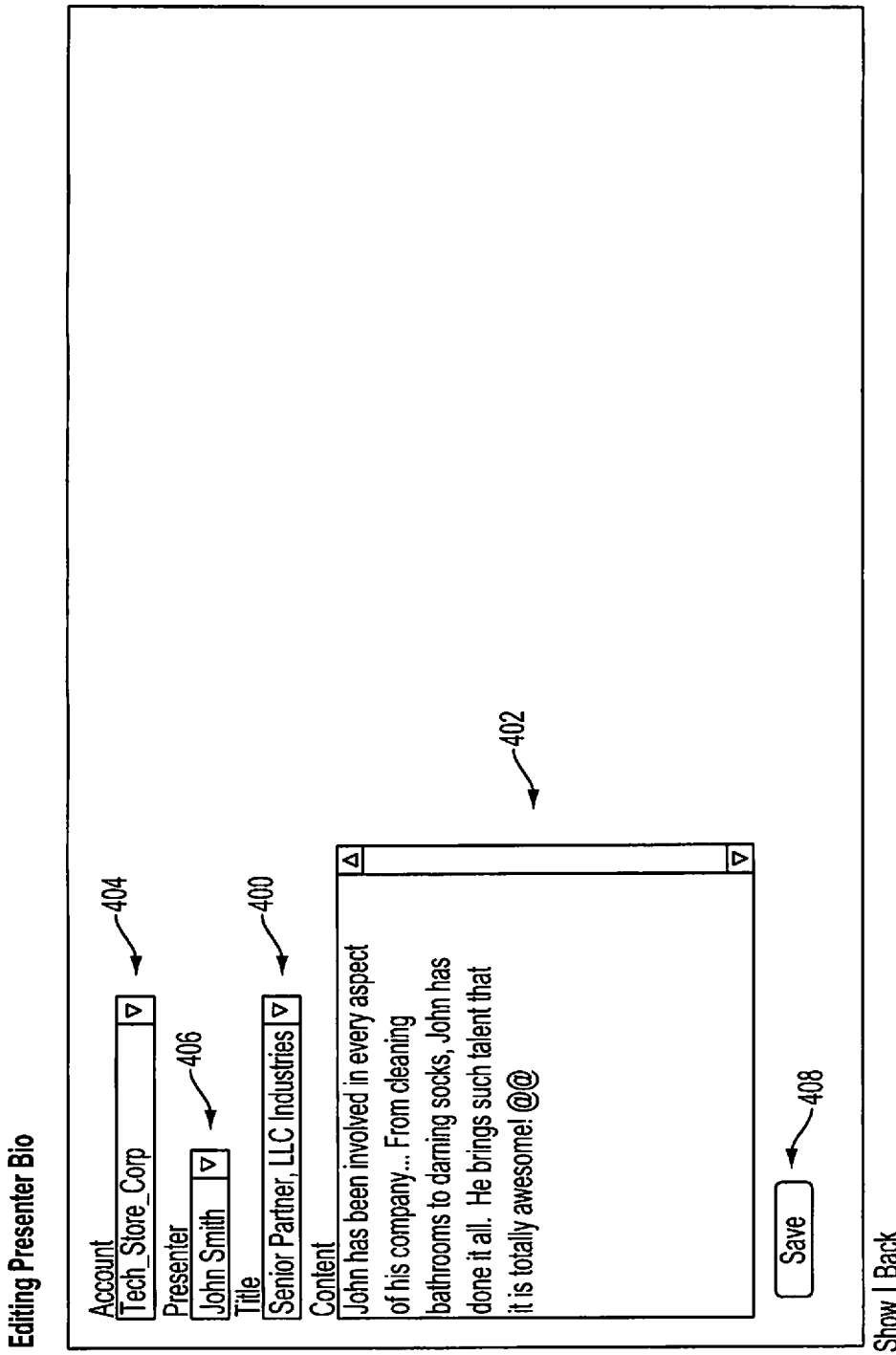
FIG. 4 is a graphical representation of a graphical user interface in a presenter bio editing mode of operation in accordance with one aspect of the present disclosure.

As shown in FIG. 4, the graphical user interface may permit creation or editing of a presenter bio or profile by prompting a user to supply a title in text box 400. The user may also be prompted to provide a bio or profile in text box 402. It is envisioned that this prompt may be accessed by presenters. Alternatively or additionally, it is envisioned that this prompt may be accessed by an admin user or client user, with controls provided in the form of drop down menus 404 and 406 for selecting a client and/or presenter for which the title and profile need to be added or edited. The title and profile information may be saved by text button control 408.

As shown in FIG. 5, the graphical user interface may permit existing presenter bios to be listed, with text fields, including the user name 500, title 502, and content 504. Additionally, new presenter bios may be added by text button control 506. Also, existing presenter bios may be edited by text button control 508.

As shown in FIG. 6, the graphical user interface may permit existing venues to be listed, and text fields may be provided for display of venue name 600, description 602, location 604 (e.g., address, city, state, and zip), and contact information 606 (e.g., phone number). Additionally, new venues may be added by text button control 608. Also, existing presenter bios may be edited by text button control 610.

As shown in FIG. 7, the graphical user interface may permit creation or editing of venues by prompting the user to supply, in various text boxes, venue name 700, description 702, location information 704, contact information 706, and map coordinates 708. Further controls 710 may include text boxes for providing information about rooms at the venue, including room name, description, and capacity. A text button control 712 may permit adding of additional rooms. A further text button control 714 may permit saving the venue information.

As shown in FIG. 8, the graphical user interface may permit existing events to be listed, with text fields, including the event name 800 and event start date 802. Additionally, text button controls may be provided to permit a user to view sessions 804, surveys 806, videos 808, home screen advertisements 810, first and second secondary screen advertisements 812 and 814, and presentation timeline 816. Also, new events may be added by text button control 818, and existing events may be edited by text button controls 820.

As shown in FIG. 9, the graphical user interface may permit creation or editing of an event. For example, a drop down menu may be provided for selecting an account 900, and text boxes may permit the user to enter an even name 902 and event description 904. Additional drop down menus may permit the user to specify beginning and end dates 906 for the event. Also, a menu control may permit the user to select one or several venues 908 to host the event. Further check boxes permit the user to select to finalize the event schedule 910 and/or finalize presentation manifests 912. Text button control 914 permits the event information to be saved. If the user selected to finalize the event schedule, then the text button control 914 may also trigger write out of the event schedule and upload thereof to a content delivery network for retrieval by users at the event when they log in. If the user selected to finalize presentation manifests, then the text button control 914 may alternatively or additionally write out the event presentation manifests for each event session and upload them to the content delivery network for retrieval by the users at the event.

As shown in FIG. 10, the graphical user interface may permit existing event sessions to be listed, with text fields, including session name 1000, begin date 1002, duration 1004, end date 1006, and sequence number 1008. Text button controls may also be provided for viewing session presentations 1010, adding new event sessions 1012, and editing existing event sessions 1014. Check boxes 1016 may permit selection of multiple sessions, and action button 1018 may permit editing of all sessions selected by the text boxes 1016.

As shown in FIG. 11, the graphical user interface may permit existing session presentations to be listed, with text fields, including presentation name 1100, presentation type 1102, begin date 1104, duration 1006, and end date 1008. Text button controls may also be provided for viewing a presentation viewing presentation pages 1110, viewing presentation slides 1112, adding new presentations 1114, and editing existing presentations 1116. Check boxes 1118 may permit selection of multiple sessions, and action button 1120 may permit editing of all sessions selected by the text boxes 1118. A text button control 1122 may also be provided for viewing the presentation information.

As shown in FIG. 12, the graphical user interface may permit display of the presentation information 1200. Links 1202 to presentation pages may also be displayed. Another link 1204 may be provided to the presentation zip file.

As shown in FIG. 13, the graphical user interface may permit creation or editing of a presentation. For example, drop down menus may permit selection of event 1300, venue 1302, room 1304, session 1306, and presenter 1308. Additionally, various text fields may permit entry of information regarding system name 1310, display name 1312, and description 1314. Also, a set of drop down menus 1316 may permit specification of begin date and time, duration, and end date and time. Further drop down menus may permit selection of a sequence number 1318, presentation type 1320, and screen position 1322. A browser control 1324 may further allow the user to find and upload a zip file containing the presentation, and an action button 1326 may permit the user to save the presentation information.

As shown in FIG. 14, the graphical user interface may list existing slides 1400 of a presentation in sequence, together with any links 1402 associated with specific slides. Text button controls 1404 may permit editing of the slides.

As shown in FIG. 15, the graphical user interface may permit update of presentation pages. Information regarding the presentation may be displayed at 1500, including account, presenter, name, description, dates, total pages, venue, room, and channel. Additionally, a page navigation control 1502 may permit the user to navigate the pages of the presentation. Further, an action button 1504 may save and broadcast the current page indicated by the page navigation control 1502.

Figure 16:
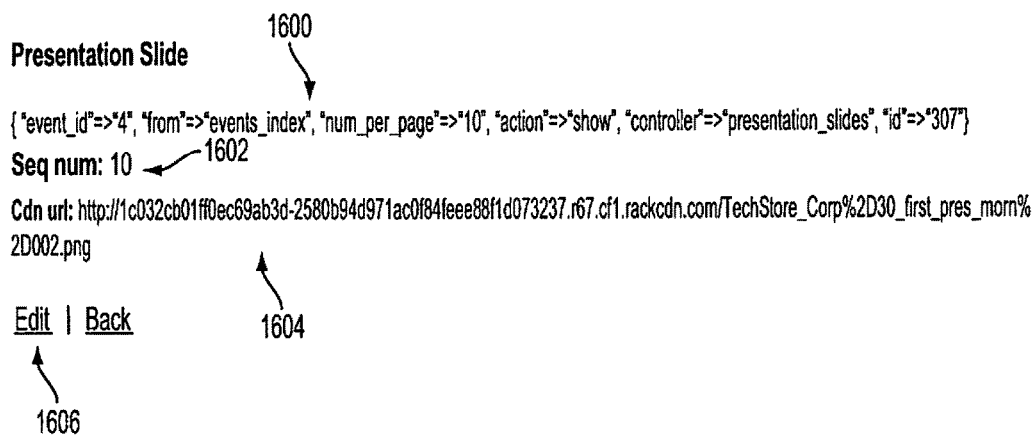
FIG. 16 is a graphical representation of a graphical user interface in a presentation slide information display mode of operation in accordance with one aspect of the present disclosure.

As shown in FIG. 16, the graphical user interface may permit display of presentation slide information. For example, a text field 1602 may provide a sequence number of the slide. Additionally, a link 1604 to the presentation slide may be provided. Further, a text button control 1606 may permit editing of the presentation slide.

Figure 17:
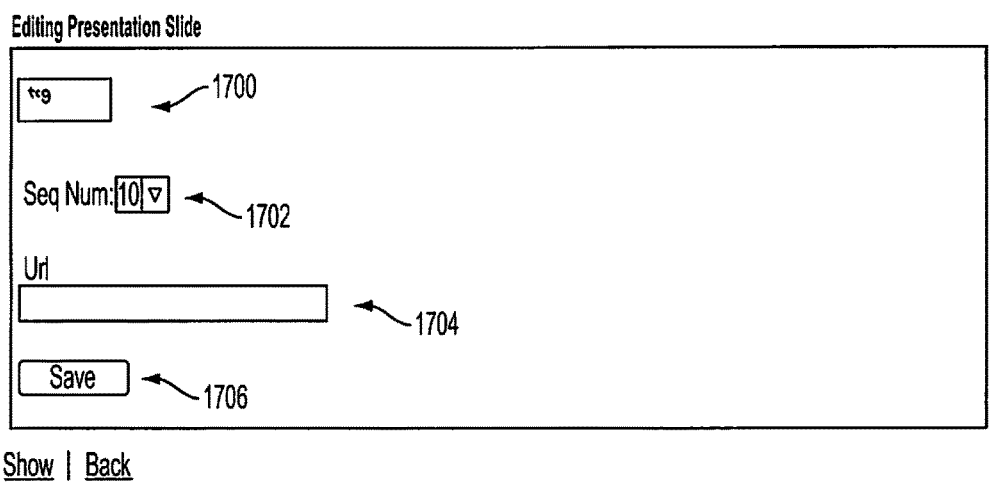
FIG. 17 is a graphical representation of a graphical user interface in a presentation slide editing mode of operation in accordance with one aspect of the present disclosure.

As shown in FIG. 17, the graphical user interface may permit editing of presentation slide information. For example, a display of a thumbnail image 1700 of the slide may be provided. Additionally, a drop down menu 1702 may permit selection of a sequence number for the slide. Also, a text box 1704 may permit specification of a link to a slide. Further, an action button 1706 may permit the edited slide information to be saved.

As shown in FIG. 18, the graphical user interface may permit existing surveys for an event to be listed. For example, various text fields may display survey name 1800, event name 1802, survey type 1804 (e.g., survey, poll, initial), and creation date and time 1806. Additionally, text button controls may be provided to take an existing survey 1808, edit an existing survey 1810, or add a new survey 1812.

As shown in FIG. 19, the graphical user interface may allow a user to take a survey. For example, text fields may display questions 1900 above a set of answers associated with radio button controls 1902. Additionally, users may select answers by interacting with a touch screen a radio button control locations. Also, an action button 1904 permits the interactions of the user in taking the survey to be saved.

As shown in FIG. 20, the graphical user interface may allow surveys to be created and edited. For example, a text box may permit the user to provide a survey name 2000, and a drop down menu may permit the user to select a survey type 2002. Additionally, text button controls may permit the user to add questions 2004 and answers 2006 and 2008. Also, for a particular question, drop down menus may permit selection of a sequence number 2010, a correct answer 2012, and answer choices 2014. Further, text boxes may permit the user to provide the question text 2016 and answer text 2018. Finally, an action button 2020 may permit the user to save the survey.

As shown in FIG. 21, the graphical user interface may permit existing videos for an event to be listed. For example, text fields may display the timeline presentation 2100, the video name 2102, a link to the video 2104, and an upload date 2106. Additionally, text button controls may permit the user to add a new video 2108 and edit an existing video 2110.

As shown in FIG. 22, the graphical user interface may permit the user to add or edit a video. For example, a drop down menu 2200 may permit the user to select an event, and a text box 2202 may permit the user to enter a name of the video. Additionally, a browser control 2204 may permit the user to search for and upload a video or provide a link to the video. Finally, an action button 2206 may permit the user to save the video information.

As shown in FIG. 23, the graphical user interface may permit existing home screen advertisements for events to be listed. For example, various text fields may display the event name 2300, the name of the home screen advertisement 2302, and a home sequence number 2304. Additionally, a thumbnail image 2306 of the home screen advertisement may be displayed. Further, text button controls may permit the user to create a new home screen advertisement 2308 or edit an existing home screen advertisement 2310.

As shown in FIG. 24, the graphical user interface may permit users to add a new home screen advertisement or edit an existing home screen advertisement. For example, drop down menus may permit the user to select an event 2400, select a duration 2402, and select a sequence number 2404.

Additionally, text boxes may permit the user to provide a name 2406 for the home screen advertisement and a link 2408 to a website associated with the home screen advertisement. Also, a browser control 2410 may permit the user to search for and upload the home screen advertisement, or provide a link to the home screen advertisement. Finally, an action button 2412 may permit the user to save the home screen advertisement.

Figure 25:
FIG. 25 is a graphical representation of a graphical user interface in a home screen advertisement information display mode of operation in accordance with one aspect of the present disclosure.

As shown in FIG. 25, the graphical user interface may permit display of information regarding the home screen advertisement. For example, some or all of the information described above may be displayed at 2500 and 2502. Additionally, an image of the home screen advertisement may be displayed at 2504.

As shown in FIG. 26, the graphical user interface may permit existing first secondary screen advertisements to be listed. For example, various text fields may display event name 2600, first secondary screen advertisement name 2602, and first secondary screen sequence number 2604. Additionally, a thumbnail image 2606 of the first secondary screen advertisement may be displayed. Also, text button controls may be provided that allow a user to add a new first secondary screen advertisement 2608, or edit an existing secondary screen advertisement 2610.

As shown in FIG. 27, the graphical user interface may permit users to add a new first secondary screen advertisement or edit an existing first secondary screen advertisement. For example, drop down menus may permit the user to select an event 2400, select a duration 2402, select a sequence number 2404, and select a subtype 2406 (e.g., displays on top). Additionally, text boxes may permit the user to provide a name 2408 for the first secondary screen advertisement and a link 2410 to a website associated with the first secondary screen advertisement. Also, a browser control 2412 may permit the user to search for and upload the first secondary screen advertisement, or provide a link to the first secondary screen advertisement. Finally, an action button 2414 may permit the user to save the first secondary screen advertisement.

Figure 28:
FIG. 28 is a graphical representation of a graphical user interface in a first secondary screen advertisement information display mode of operation in accordance with one aspect of the present disclosure.

As shown in FIG. 28, the graphical user interface may permit display of information regarding the first secondary screen advertisement. For example, some or all of the information described above may be displayed at 2800 and 2802. Additionally, an image of the first secondary screen advertisement may be displayed at 2804.

As shown in FIG. 29, the graphical user interface may permit existing second secondary screen advertisements to be listed. For example, various text fields may display event name 2900, second secondary screen advertisement name 2902, and second secondary screen sequence number 2904. Additionally, a thumbnail image 2906 of the second secondary screen advertisement may be displayed. Also, text button controls may be provided that allow a user to add a new second secondary screen advertisement 2908, or edit an existing secondary screen advertisement 2910.

As shown in FIG. 30, the graphical user interface may permit users to add a new second secondary screen advertisement or edit an existing second secondary screen advertisement. For example, drop down menus may permit the user to select an event 3000, select a duration 3002, and select a sequence number 3004. Additionally, text boxes may permit the user to provide a name 3006 for the first secondary screen advertisement and a link 3008 to a website associated with the first secondary screen advertisement. Also, a browser control 3010 may permit the user to search for and upload the second secondary screen advertisement, or provide a link to the second secondary screen advertisement. Finally, an action button 3012 may permit the user to save the first secondary screen advertisement.

Figure 31:
FIG. 31 is a graphical representation of a graphical user interface in a second secondary screen advertisement information display mode of operation in accordance with one aspect of the present disclosure.

As shown in FIG. 31, the graphical user interface may permit display of information regarding the second secondary screen advertisement. For example, some or all of the information described above may be displayed at 3100 and 3102. Additionally, an image of the second secondary screen advertisement may be displayed at 3104.

As shown in FIG. 32, the graphical user interface may permit display of an event timeline. For example, various text fields may displaying session name 3200, presentation name 3202, and slide sequence number 3204. Additionally, thumbnails 3206 of slide images may be displayed. Further, drop down menus may be provided next to each slide that permit the user to select additional content (e.g., survey, advertisement, video) for the first secondary screen 3210, and to select additional content (e.g., survey, advertisement, video) for the second secondary screen 3212. Specifying the additional content with respect to a particular slide and a particular secondary screen permits the additional content to be delivered by the particular secondary screen at the time the particular slide is delivered by a primary screen. Stated differently, delivery of the slide by the primary screen triggers delivery of the additional content associated with that slide by the secondary screen designated for delivery of the additional content. Further, a text button control 3214 may permit the user to save the timeline.

Figure 33:
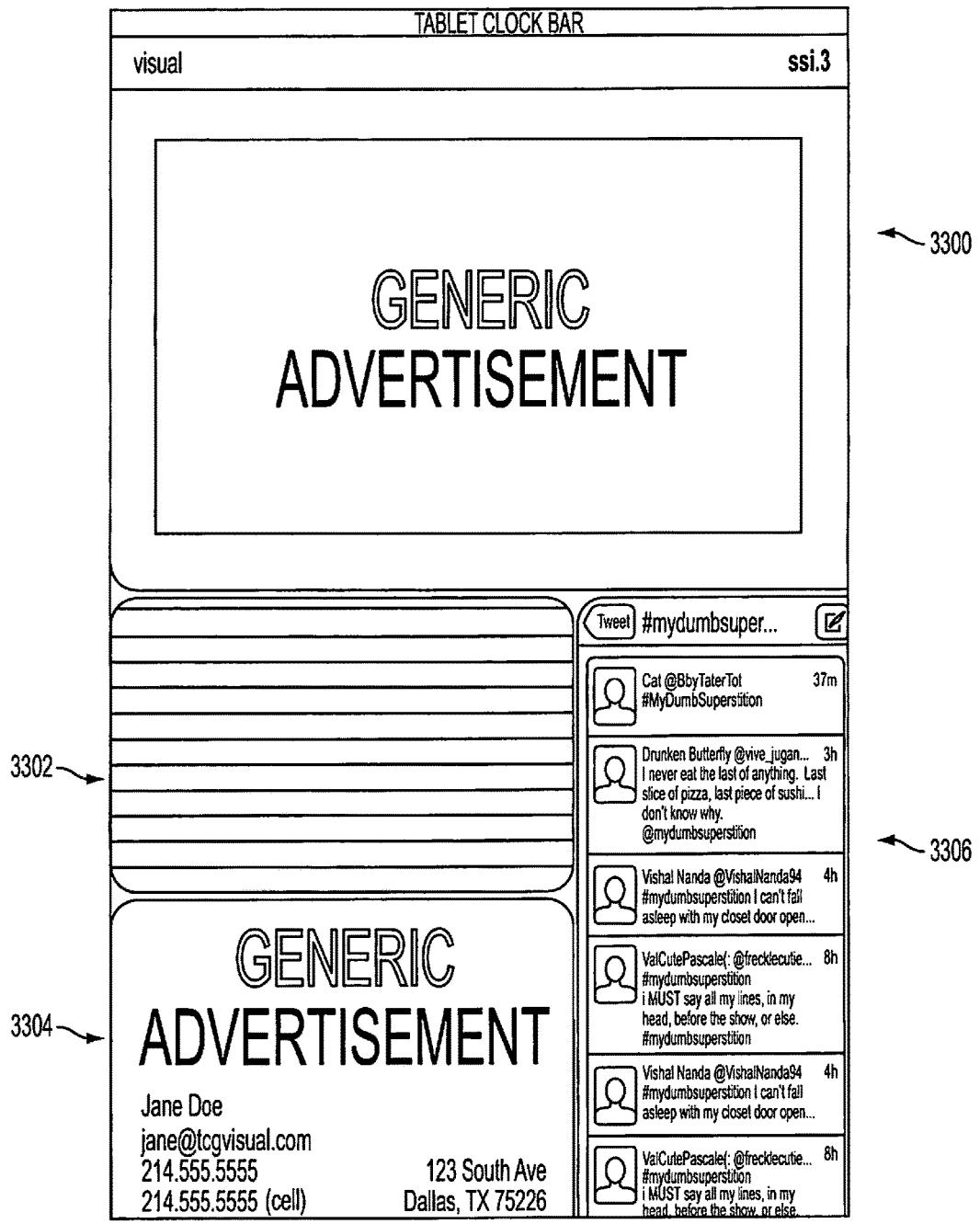
FIG. 33 is a graphical representation of a mobile device application in accordance with one aspect of the present disclosure.

As shown in FIG. 33, an application running on the audience member's mobile device, such as a tablet or smartphone, may configure the mobile device with a primary screen 3300, a first secondary screen 3302, a second secondary screen 3304, and/or one or more additional tools 3306, such as social media tools, question and answer tools, gaming tools, and newsfeed tools. In some implementations, the application may permit the user to personalize window sizes and features. It is further envisioned that the attendees may select which windows and/or tools will be displayed and personalize their functions, subject to any permissions set, either in the application, event, session, or presentation, by organizers or presenters.

It is envisioned that an attendee user may search for and download the application from an app store based on a client name, and that a particular app may be branded and skinned for the client. It is also envisioned that the application may configure the mobile device with a main screen or home screen that provides maps, reminders, schedule changes, announcements, news feeds, home screen advertisements, current events that are scheduled at the venue, and branded content. For example, the application may provide interactive trade floor maps, and/or allow attendees to search an exhibitors list by name and type. It is also envisioned that the application may allow attendees to find contact information and websites, exhibitor specific sessions populated with exhibitor specific content or catalogs, and provide an ability to find exhibitors through QR codes.

In some implementations, it is envisioned that the user may log into the application with a predetermined username and password. Demographic information of attendees may be developed by demographic questions at the beginning of log in or found under "my profile." It is envisioned that, depending on the event, attendees may be asked to answer questions related to age, sex, and income levels. Then the user may log into individual sessions. Tracking and analytics may further allow event organizers to know which sessions each attendee is logged into.

During a presentation that a user is logged into, presentation slides may be available to attendees via the application. For example, slides may be turned into image files and uploaded to the content management system by conference organizers or hired crew. As the presentation commences, an attendee may receive duplicate versions of the show's slides as primary screen content. Alternatively or additionally, attendees may receive complimentary slides as secondary screen content. It is envisioned that an operator may release individual slides to attendees as a speaker advances slides. Alternatively or additionally, it is envisioned that slides may be sent simultaneously to the presenter and the mobile device through the content management system. In some implementations, the user of the mobile device may go back to view previous slides, go forward through the slides up until the point of release, and catch up to the most current point of a presentation. It is also envisioned that the user will automatically be advanced to a new slide if they are following along with the current slides.

In some implementations, mobile device users may be permitted to save and/or send slides by email. For example, it is envisioned that users may choose to save or email individual slides or save and email an entire presentation. Additionally, it is envisioned that "saving" a slide will save it to the user's photo album found on the device, and that an email option may allow the user to enter any email address and send via the device's normal email path. Also, it is envisioned that the slides may send and save as .jpg files. In some implementations, it is envisioned that organizers may turn off saving or emailing options by presentation. In this case, the user may still receive the slides to their device view the slides, but be prevented from saving or emailing the slides. It is also envisioned that organizers may turn off options to save an email slides individually.

In some implementations, organizers may send videos to users. In these implementations, organizers may be permitted to mute the videos in the content management system. It is envisioned that users may also be permitted to save videos to the device under the device's video application, and that video save permissions may be turned off in the content management system.

In some implementations, organizers may embed one or more hyperlinks into a slide. In these implementations, the hyperlinks may open in the application without taking the user out of the application. It is envisioned that the attendee may share the hyperlink via email or social media, and that the hyperlink does not provide a standard browser bar or address bar. It is also envisioned that the attendee may save all of the hyperlinks in a presentation to a special notes page.

In some implementations, organizers may have flexibility in terms of making slides available to the user. Additionally, organizers may have control over whether and to what degree passwords to log into sessions may be displayed. It is also envisioned that unique/one time use session passwords may be set for individuals. It is further envisioned that, once content is released, the same slides can be removed from view, only to be seen if the user saved or emailed the slides. Organizers may also have an option to make a session unavailable to attendees that do not log in within a predetermined window of time.

In some implementations, the application may permit the user to take notes. For example, the user may be permitted to take notes about the session in the same window that displays the content. It is envisioned that the user may be permitted to create a new note, delete a current note, save a note, view all notes in a list, and/or email notes. Additionally, notes may be saved with a date and time stamp. Also, the user may be permitted to manipulate notes as a group, such as delete and email all or select which notes to delete or email. Further, notes may automatically correlate with a specific slide, and may be emailed and/or saved with the slide.

In some implementations, organizers and speakers may assign multiple-choice survey or polling questions to specific slides. As a slide advances forward the question may automatically appear. The questions and answers may be entered into the content management system as described above. Individuals logged into the application may provide profiles having demographic information, and this demographic information may be associated with the answers and other interaction data sent by the application and compiled by the content management system. It is envisioned that the compiled answers and demographic information may be viewed by organizers after a presentation, and/or that the compiled answers and demographic information may be immediately available to presenters, organizers, and/or attendees. Presenters and or mobile devices may then display the information to the audience. It is further envisioned that new questions may be entered through a device controlled by the presenter, and that sends the information to the content management system. It is further envisioned that short answers and/or short essays may be filled out by attendees in a short answer tool of the application.

In some implementations, the application may configure the mobile device to display session schedules. For example, the application may display the upcoming sequence of speakers or events (i.e., award given, contest, etc.) in the session into which the user is currently logged in. Additionally, bios and descriptions may be entered in to the content management system for each part of the session, and these may be displayed by one of the secondary screens.

In some implementations, an event schedule with session descriptions and biographies may be found on the application. It is envisioned that the user may select sessions to mark as "favorites" and the sessions may then appear in their personalized schedule. It is also envisioned that users may also log into a session using either the event schedule or a My Schedule feature of the personalized schedule.

In some implementations, functionality of a social tool of the application may be configured with predetermined hashtags that may be set per session. For example, users may tweet using one of the predetermined hashtags in order for their tweet to appear in the social tool window. It is also envisioned that intranet communications may be leveraged by the social tool to provide an instant message or chat feature for the attendees. It is additionally envisioned that users may have options to make a message open to an entire event, a particular session, a particular group of individual attendees, or an attendee. It is further envisioned that a "my profile" area may permit attendees to upload photos, provide contact information, create a short bio, and/or personalize information. This area may be swapped out at need for a presenter bio, a communication tool, etc.

In some implementations, it is envisioned that another window of the application may allow the user to create their individualized social media epicenter. For this window, organizers may determine the social media tools they want to use, prompt, and discuss on for their event. It is envisioned that the attendee may drag and drop the available widgets for the social media applications they wish to use for the event, thus creating an individualized platform for social media.

In some implementations, it is envisioned that another window of the application may be a question and answer tool. Using this tool, users may submit questions that may be displayed for the speaker to answer. It is envisioned that the questions may build up, and that speaker may address the questions at a preferred time or pace. Attendees will also be able to like questions, which may cause those to appear higher in the list and result in those questions being answered more quickly.

In some implementations, it is envisioned that another window of the application may be a gaming tool. For example, crossword puzzles, word searches, or similar word games may continue throughout sessions or events. It is envisioned that prizes may be awarded to encourage involvement. It is also envisioned that answers may be spread through the main screen presentations, secondary screen slides, and verbally.

In some implementations, it is envisioned that another window of the application may be a newsfeed tool. For example, this tool may be a window that contains RSS feeds that display press releases and related news articles.

Figure 34:
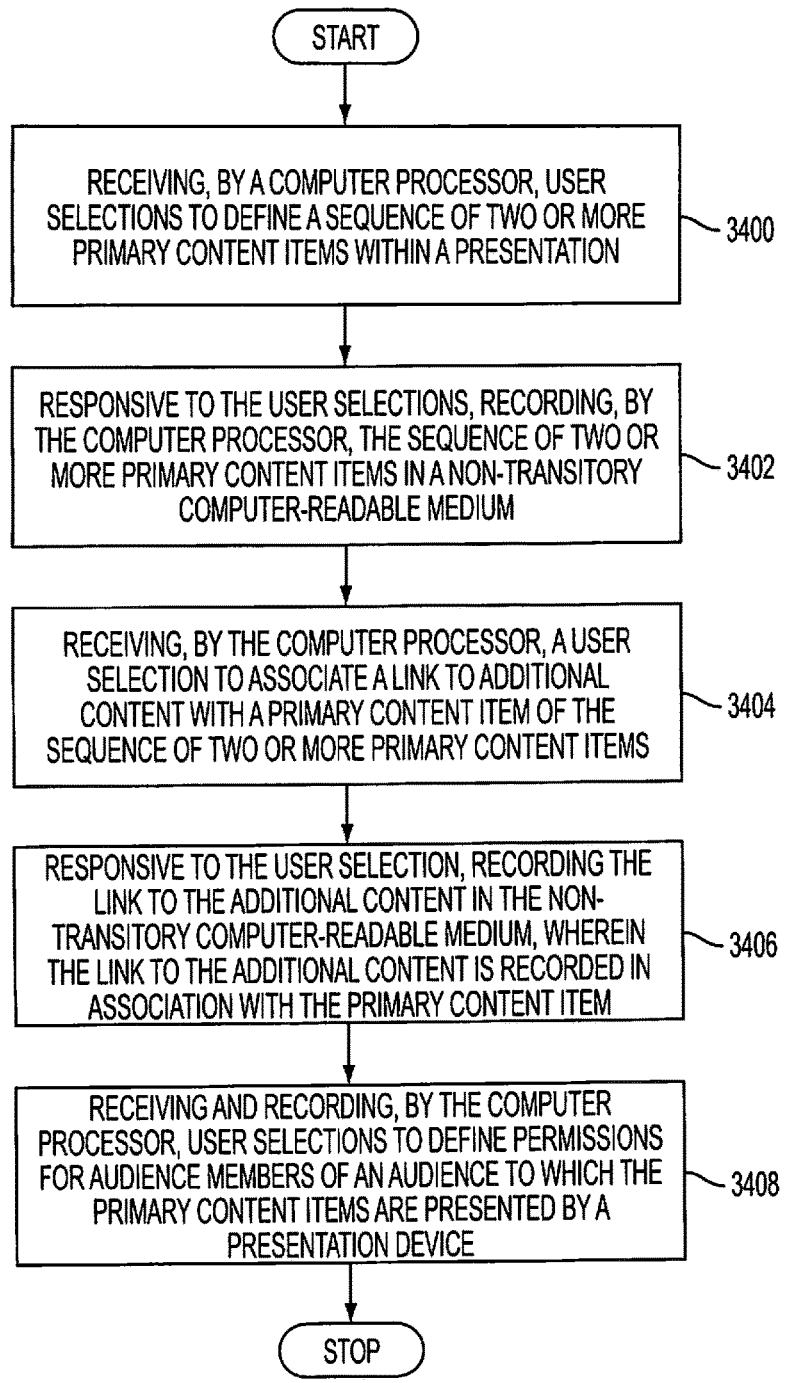
FIG. 34 is a flow diagram illustrating a method of authoring an interactive presentation in accordance with one aspect of the present disclosure.

Turning now to FIG. 34, a method of authoring an interactive presentation begins, at step 3400, with receiving, by a computer processor, user selections to define a sequence of two or more primary content items within a presentation. For example, the primary content item may a slide, and the sequence may be a sequence of two or more slides. Step 3400 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3400 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3400 to step 3402.

At step 3402, the method includes, responsive to the user selections, recording, by the computer processor, the sequence of two or more primary content items in a non-transitory computer-readable medium. The non-transitory computer readable medium may be a datastore, database, computer memory, or the like. Step 3402 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3402 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3402 to step 3404.

At step 3404, the method includes receiving, by the computer processor, a user selection to associate a link to additional content with a primary content item of the sequence of two or more primary content items. The additional content may be one or more of a poll, a survey; a ballot; a questionnaire; a video; or an advertisement. Step 3404 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3404 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3404 to step 3406.

At step 3406, the method includes, responsive to the user selection, recording the link to the additional content in the non-transitory computer-readable medium, wherein the link to the additional content is recorded in association with the primary content item. Step 3406 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3406 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3406 to step 3408.

At step 3408, the method includes receiving and recording, by the computer processor, user selections to define permissions for audience members of an audience to which the primary content items are presented by a presentation device. In some implementations, the permissions are regarding one or more of interaction of the audience members with the primary content and/or the additional content via applications, operating on mobile devices of audience members, operatively connected to allow the audience members to receive and interact with the primary content and the additional content. In additional or alternative implementations, the permissions are regarding available selections, by the audience members, of tools available in the applications, wherein the tools include a social media tool, a question and answer tool, a gaming tool, a newsfeed tool, and/or a second screen tool. Step 3408 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3408 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.).

Figure 35:
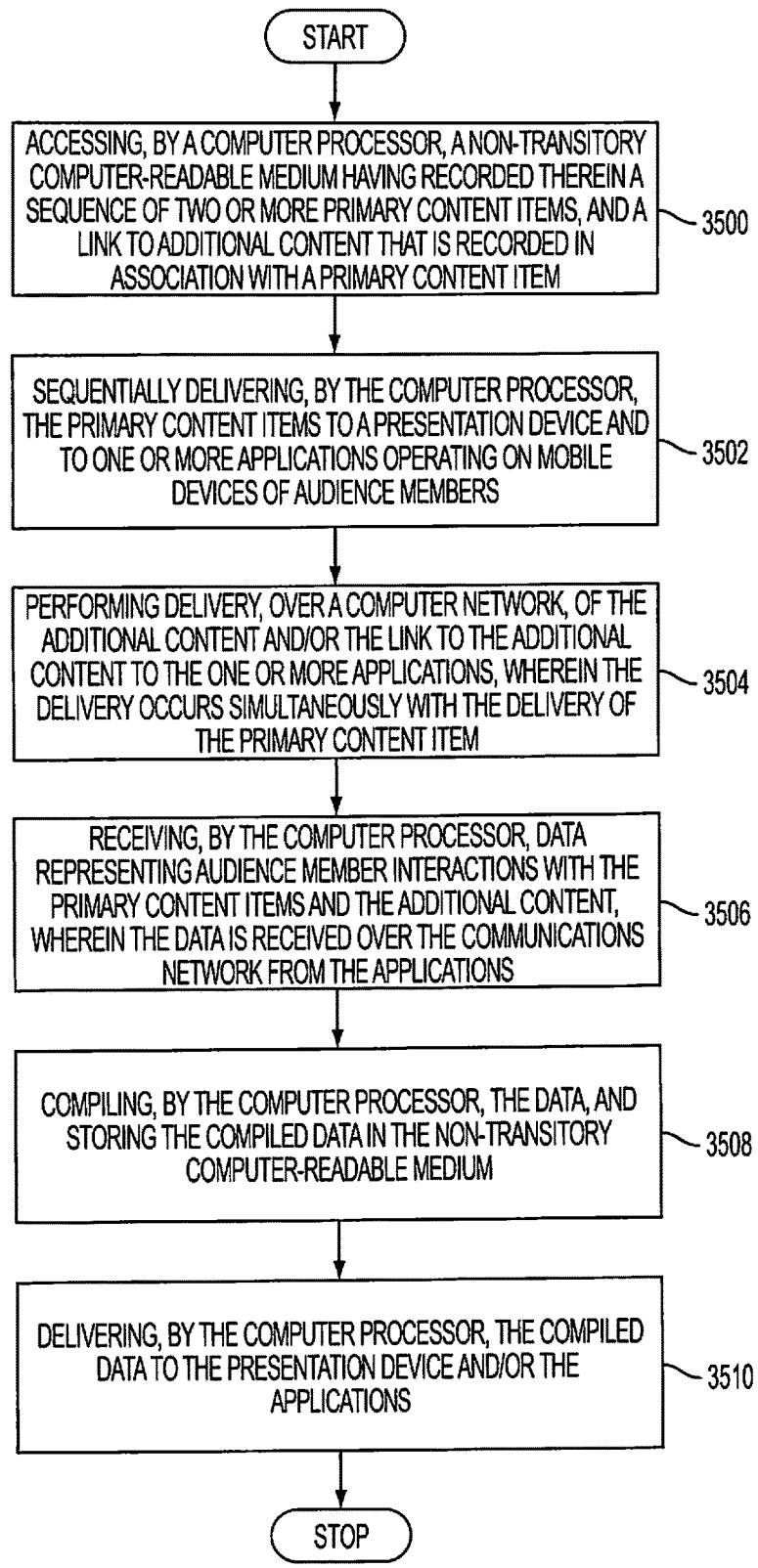
FIG. 35 is a flow diagram illustrating a method of delivering an interactive presentation in accordance with one aspect of the present disclosure.

Turning to FIG. 35, a method of delivering an interactive presentation begins, at step 3500, with accessing, by a computer processor, a non-transitory computer-readable medium having recorded therein a sequence of two or more primary content items. The non-transitory computer-readable medium also has recorded therein a link to additional content that is recorded in association with a primary content item of the sequence of two or more primary content items. The primary content item may be a slide, and the additional content may be a poll, a survey, a ballot, a questionnaire, a video, and/or an advertisement. Step 3500 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3500 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3500 to step 3502.

At step 3502, the method includes delivering, by the computer processor, the primary content items to a presentation device operatively connected to present the primary content items to an audience. Step 3502 also includes delivering the primary content items to one or more applications operating on mobile devices of audience members. The primary content items are delivered, at step 3502, in an order according to the sequence of the two or more content items. Step 3502 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3502 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3502 to step 3504.

At step 3504, the method includes performing delivery, over a computer network, of the additional content and/or link to the additional content to the one or more applications. The delivery of the additional content or link, at step 3504, occurs substantially simultaneously with the delivery of the primary content item with which the link to the additional content is recorded in association in the non-transitory computer-readable medium. Step 3504 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3504 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3504 to step 3506.

At step 3506, the method includes receiving, by the computer processor, data representing audience member interactions with the additional content. The data is received, at step 3506, over the communications network from the one or more applications. The data may include poll responses, survey responses, ballot responses, questionnaire responses, slide consumption, video consumption, or advertisement consumption. Step 3506 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3506 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3506 to step 3508.

At step 3508, the method includes compiling, by the computer processor, the data, and storing the compiled data in the non-transitory computer-readable medium. The compiled data may contain demographic data of presentation attendees that was received with the data. Step 3508 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3508 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3508 to step 3510.

At step 3510, the method includes delivering, by the computer processor, the compiled data to the presentation device and/or the applications on the mobile devices. Step 3510 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3510 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.).

Figure 36:
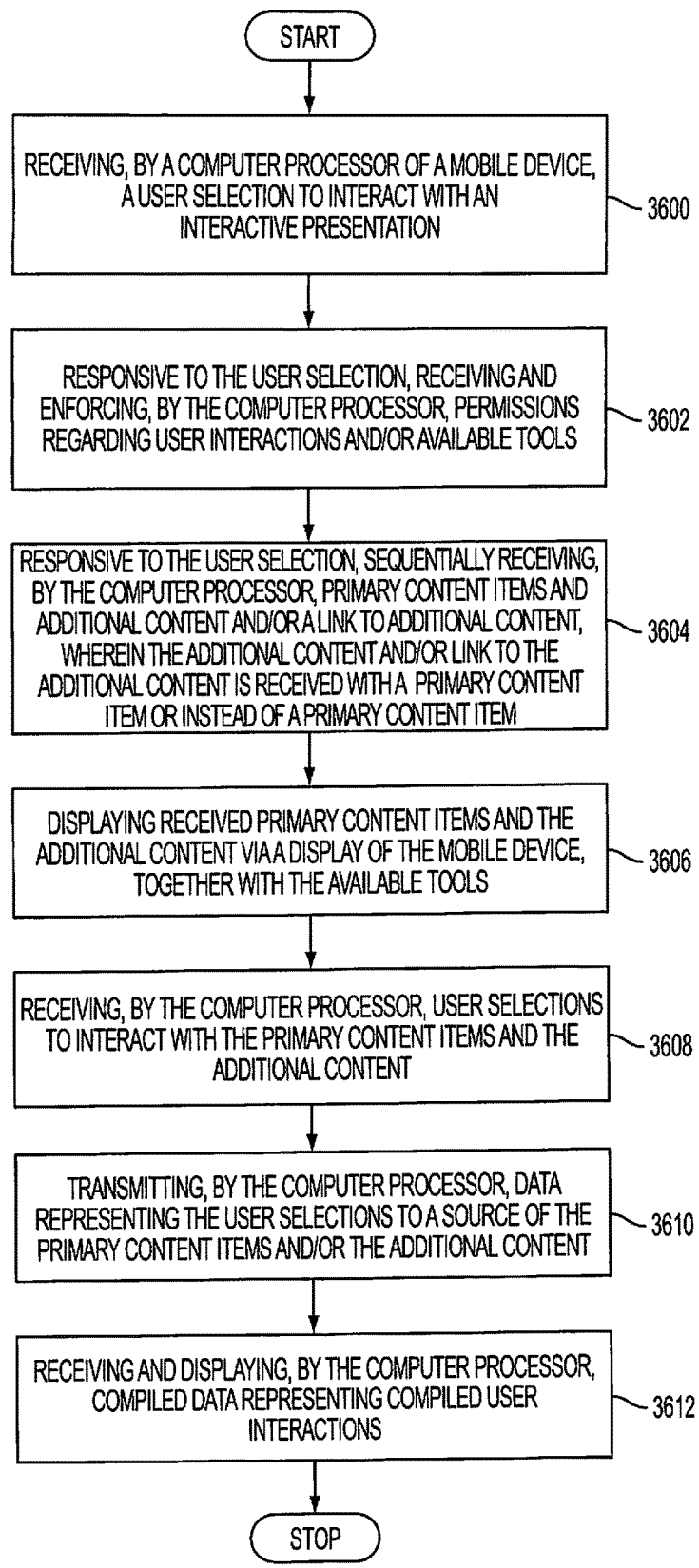
FIG. 36 is a flow diagram illustrating a method of interacting with an interactive presentation in accordance with one aspect of the present disclosure.

Turning finally to FIG. 36, a method of interacting with an interactive presentation begins, at step 3600, with receiving, by a computer processor of a mobile device, a user selection to interact with an interactive presentation. For example, step 3600 may include receiving log in credentials from an enrolled attendee. Step 3600 may also include receiving a user selection of a session and/or presentation of an event. Step 3600 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3600 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3600 to step 3602.

At step 3602, the method includes, responsive the user selection, receiving and enforcing, by the computer processor, permissions. In some implementations, the permissions are regarding interaction of a user with primary content items and/or the additional content. The primary content item may be a slide, and the additional content may be a poll, a survey; a ballot, a questionnaire, a video, and/or an advertisement. In additional or alternative implementations, the permissions are regarding available selections, by the user, of tools operable in an application of the mobile device, wherein the mobile device employs the application to display the primary content items and the additional content. Example tools include a social media tool, a question and answer tool, a gaming tool, a newsfeed tool, and/or a second screen tool. Step 3602 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3602 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3602 to step 3604.

At step 3604, the method includes, responsive to the user selection, receiving, by the computer processor, a sequence of primary content items and additional content and/or a link to additional content. It is envisioned that the additional content and/or the link to the additional content may be received either substantially simultaneously with a primary content item of the sequence of content items, or instead of a primary content item of the sequence of content items. Step 3604 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3604 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3604 to step 3606.

At step 3606, the method includes displaying received primary content items and the additional content via a display of the mobile device. In some implementations, the computer processor may employ an application to display the primary content items and the additional content. This application may further provides a social media tool, a question and answer tool, a gaming tool, a newsfeed tool, and/or a second screen tool. Step 3606 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3606 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3606 to step 3608.

At step 3608, the method includes receiving, by the computer processor, user selections to interact with the primary content items and the additional content. Example interactions include poll responses, survey responses, ballot responses, questionnaire responses, slide consumption, video consumption, and/or advertisement consumption. Step 3608 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3608 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3608 to step 3610.

At step 3610, the method includes transmitting, by the computer processor, data representing the user selections to a source of at least one of the primary content items or the additional content. The data may include poll responses, survey responses, ballot responses, questionnaire responses, slide consumption, video consumption, and/or advertisement consumption. The transmitted data may also include demographics of the user. Step 310 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3610 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.). Processing proceeds from step 3610 to step 3612.

At step 3612, the method includes receiving, by the computer processor, compiled data representing compiled user interactions, including the user selections to interact with the additional content. Step 3612 also includes displaying, by the computer processor, the compiled data via the display of the mobile device. The compiled data may include compiled demographics of users. Step 3612 may include, for example, executing machine code instructions to receive data, executing machine code instructions to access a memory location in a non-transitory computer-readable medium, and executing machine code instructions to write the data into the non-transitory computer readable medium at the accessed memory location. Alternatively or additionally, step 3612 may include, for example, executing machine code instructions to access a memory location in a non-transitory computer-readable medium, executing machine code instructions to read data out of the non-transitory computer-readable medium at the accessed memory location, and executing machine code instructions to output the data (e.g., transmit, display, etc.).

Although the present invention and its advantages have been described in detail, it should be understood that various changes, substitutions and alterations may be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of delivering an interactive presentation to audience members, the method comprising:
   transmitting, from one or more computer processors, to a mobile device application installed on mobile devices of audience members, where the mobile device application is downloaded to mobile devices of audience members from an application source:
      one or more audience member permissions to be enforced by the mobile device application installed on mobile devices of audience members,
      instructions to present, according to the one or more audience member permissions, at least part of the interactive presentation contents, and
      the at least part of the interactive presentation contents;
   receiving, by the one or more computer processors, audience member interactions with the at least part of the interactive presentation contents; and
   based on the received audience members interactions, changing a sequence of two or more primary content items in the interactive presentation for display to the audience members, or linking first additional content to at least one of the two or more primary content items for display to a first audience member and linking second additional content to the at least one of the two or more primary content items for display to a second audience member, where the first additional content can be displayed to the first audience member and the second additional content can be displayed to the second audience member during the same time.

2. The method of claim 1 where the one or more audience member permissions comprises a permission with respect to sharing via social media, by mobile devices of the audience members, the at least part of the interactive presentation contents.

3. The method of claim 1 where the mobile device application is further operable to provide a user interface that receives notes from at least one of the audience members with respect to the at least part of the interactive presentation contents.

4. The method of claim 3 where the mobile device application is further operable to share the notes via social media, together with the at least part of the interactive presentation contents, when the at least one of the audience members shares the at least part of the interactive presentation contents via social media.

5. An apparatus for presenting an interactive presentation to audience members, the apparatus comprising:
   a memory; and
   one or more processors communicatively coupled to the memory, the one or more processors configured for:
      transmitting, to a mobile device application installed on mobile devices of audience members, where the mobile device application is downloaded to mobile devices of audience members from an application source:
         one or more audience member permissions to be enforced by the mobile device application installed on mobile devices of audience members,
         instructions to present, according to the one or more audience member permissions, at least part of the interactive presentation contents, and
         the at least part of the interactive presentation contents;
      receiving audience member interactions with the at least part of the interactive presentation contents; and
      based on the received audience members interactions, changing a sequence of two or more primary content items in the interactive presentation for display to the audience members, or linking first additional content to at least one of the two or more primary content items for display to a first audience member and linking second additional content to at least one of the two or more primary content items for display to a second audience member, where the first additional content can be displayed to the first audience member and the second additional content can be displayed to the second audience member during the same time.

6. The apparatus of claim 5 where the one or more audience member permissions comprises a permission with respect to sharing via social media, by mobile devices of the audience members, the at least part of the interactive presentation contents.

7. The apparatus of claim 5 where the mobile device application is further operable to provide a user interface that receives notes from at least one of the audience members with respect to the at least part of the interactive presentation contents.

8. The apparatus of claim 7 where the mobile device application is further operable to share the notes via social media, together with the at least part of the interactive presentation contents, when the at least one of the audience members shares the at least part of the interactive presentation contents via social media.

9. A method of delivering an interactive presentation to audience members, the method comprising:
   receiving, by a mobile device application installed on mobile devices of audience members, where the mobile device application is downloaded to mobile devices of audience members from an application source:
      one or more audience member permissions to be enforced by the mobile device application installed on mobile devices of audience members,
      instructions to present, according to the one or more audience member permissions, at least part of the interactive presentation contents, and
      the at least part of the interactive presentation contents;
   permitting a user of the mobile device to interact with the at least part of the interactive presentation contents according to the audience member permissions; and based on the interaction, presenting to the user, a changed sequence of two or more primary content items in the interactive presentation, or one of a first additional content item linked to at least one of the two or more primary content items or a second additional content item linked to at least one of the two or more primary content items, where the first additional content item can be displayed to the user or another user and the second additional content item can be displayed to the user or the another use during the same time.

10. The method of claim 9 where the at least part of the interactive presentation contents include at least one of presentation slides or additional media.

11. The method of claim 10 where the additional media comprises a video.

12. The method of claim 9 where the one or more audience member permissions relate to sharing via social media, by mobile devices of audience members, all or a portion of the at least part of the interactive presentation contents.

13. The method of claim 9 where the one or more audience member permissions relate to saving, to the mobile devices of the audience members, all or a portion of the at least part of the interactive presentation contents.

14. The method of claim 9 further comprising providing a user interface, by the mobile device, that receives notes from the user with respect to all or a portion of the at least part of the interactive presentation contents.

15. The method of claim 14 further comprising sharing the notes via social media together with the all or a portion of the at least part of the interactive presentation contents when the user shares the all or a portion of the at least part of the interactive presentation contents via social media.

16. An apparatus for presenting an interactive presentation to audience members, the apparatus comprising:
a memory; and
one or more processors communicatively coupled to the memory, the one or more processors configured for:
receiving, by a mobile device application installed on mobile devices of audience members, where the mobile device application is downloaded to mobile devices of audience members from an application source:
one or more audience member permissions to be enforced by the mobile device application installed on mobile devices of audience members,
instructions to present, according to the one or more audience member permissions, at least part of the interactive presentation contents, and
the at least part of the interactive presentation contents;
permitting a user of the mobile device to interact with the at least part of the interactive presentation contents according to the audience member permissions; and
based on the interaction, presenting to the user, a changed sequence of two or more primary content items in the interactive presentation, or one of a first additional content item linked to at least one of the two or more primary content items or a second additional content item linked to at least one of the two or more primary content items, where the first additional content item can be displayed to the user or another user and the second additional content item can be displayed to the user or the another use during the same time.

17. The apparatus of claim 16 where the at least part of the interactive presentation contents include at least one of presentation slides or additional media.

18. The apparatus of claim 17 where the additional media comprises a video.

19. The apparatus of claim 16 where the one or more audience member permissions relate to sharing via social media, by mobile devices of audience members, all or a portion of the at least part of the interactive presentation contents.

20. The apparatus of claim 16 further comprising means for providing a user interface, by the mobile device, that receives notes from the user with respect to all or a portion of the at least part of the interactive presentation contents.

21. The apparatus of claim 20 further comprising means for sharing the notes via social media together with the all or a portion of the at least part of the interactive presentation contents when the user shares the all or a portion of the at least part of the interactive presentation contents via social media.

22. A method of delivering an interactive presentation to audience members, the method comprising:
transmitting, from one or more computer processors, to a mobile device application installed on mobile devices of audience members, where the mobile device application is downloaded to mobile devices of audience members from an application source:
one or more audience member permissions to be enforced by the mobile device application installed on mobile devices of audience members,
instructions to present, according to the one or more audience member permissions, at least part of the interactive presentation contents, and
the at least part of the interactive presentation contents;
receiving, by the one or more computer processors, audience member interactions with the at least part of the interactive presentation contents; and
based on the received audience members interactions, changing the content of the interactive presentation, or linking first additional content to at least one of two or more primary content items for display to a first audience member and linking second additional content to the at least one of the two or more primary content items for display to a second audience member, where the first additional content can be displayed to the first audience member and the second additional content can be displayed to the second audience member during the same time.

23. A method of delivering an interactive presentation to audience members, the method comprising:
receiving, by a mobile device application installed on mobile devices of audience members, where the mobile device application is downloaded to mobile devices of audience members from an application source:
one or more audience member permissions to be enforced by the mobile device application installed on mobile devices of audience members,
instructions to present, according to the one or more audience member permissions, at least part of the interactive presentation contents, and
the at least part of the interactive presentation contents;
permitting a user of the mobile device to interact with the at least part of the interactive presentation contents according to the audience member permissions; and
based on the interaction, presenting to the user, changed content of the interactive presentation, or one of a first additional content item linked to at least one of two or more primary content items or a second additional content item linked to at least one of the two or more primary content items, where the first additional content item can be displayed to the user or another user and the second additional content item can be displayed to the user or the another use during the same time.

\* \* \* \* \*